United States Patent
Ackaouy et al.

(10) Patent No.: US 7,284,030 B2
(45) Date of Patent: Oct. 16, 2007

(54) APPARATUS AND METHOD FOR PROCESSING DATA IN A NETWORK

(75) Inventors: Emmanuel Ackaouy, San Francisco, CA (US); Matthew Amdur, San Francisco, CA (US); Kartik Ayyar, Santa Clara, CA (US); David Grunwald, Santa Clara, CA (US); Ashish Prakash, Morrisville, NC (US); Brian Quirion, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 804 days.

(21) Appl. No.: 10/245,798

(22) Filed: Sep. 16, 2002

(65) Prior Publication Data

US 2004/0054748 A1    Mar. 18, 2004

(51) Int. Cl.
*G06F 15/13*    (2006.01)
(52) U.S. Cl. .................. 709/202; 707/206; 705/26; 711/118
(58) Field of Classification Search ................ 709/202; 707/206; 705/26; 711/118
See application file for complete search history.

(56) References Cited

U.S. PATENT DOCUMENTS

| | | | |
|---|---|---|---|
| 5,535,375 A | 7/1996 | Eshel et al. | |
| 5,864,852 A | 1/1999 | Luotonen | |
| 5,893,140 A * | 4/1999 | Vahalia et al. | 711/118 |
| 5,907,678 A | 5/1999 | Housel, III et al. | |
| 5,924,116 A | 7/1999 | Aggarwal et al. | |
| 5,946,690 A | 8/1999 | Pitts | |
| 5,950,205 A | 9/1999 | Aviani, Jr. | |
| 5,987,506 A | 11/1999 | Carter et al. | |
| 5,991,810 A | 11/1999 | Shapiro et al. | |
| 6,065,058 A | 5/2000 | Hailpern et al. | |
| 6,085,193 A | 7/2000 | Malkin et al. | |
| 6,085,234 A | 7/2000 | Pitts et al. | |
| 6,167,446 A | 12/2000 | Lister et al. | |
| 6,178,461 B1 | 1/2001 | Chan et al. | |
| 6,182,111 B1 | 1/2001 | Inohara et al. | |
| 6,230,160 B1 | 5/2001 | Chan et al. | |
| 6,282,580 B1 | 8/2001 | Chang | |
| 6,292,835 B1 | 9/2001 | Huang et al. | |
| 6,311,216 B1 | 10/2001 | Smith et al. | |

(Continued)

FOREIGN PATENT DOCUMENTS

WO    WO 02/42874 A2    5/2002

OTHER PUBLICATIONS

"Web Cache Coherence" by A. Dingle, et al. Computer Networks and ISDN Systems, No. Holland Publishing. Amsterdam, NL, vol. 28, No. 11, May 1996. pp. 907-920.

(Continued)

*Primary Examiner*—Jinsong Hu
(74) *Attorney, Agent, or Firm*—Arnold M. de Guzman

(57) ABSTRACT

In one embodiment, the invention provides a method of transforming a request from a client to a proxy cache, the method comprising: receiving a request from a client, where the request is based upon a first open standard protocol; and translating the request from the first open standard protocol into a second open standard protocol at a file system level; and transmitting the request in the second open standard protocol to a server.

12 Claims, 20 Drawing Sheets

U.S. PATENT DOCUMENTS

| | | | |
|---|---|---|---|
| 6,370,620 B1 | 4/2002 | Wu et al. | |
| 6,438,652 B1 | 8/2002 | Jordan et al. | |
| 6,442,651 B2 | 8/2002 | Crow et al. | |
| 6,463,508 B1 | 10/2002 | Wolf et al. | |
| 6,505,241 B2 | 1/2003 | Pitts | |
| 6,542,964 B1 | 4/2003 | Scharber | |
| 6,553,411 B1 | 4/2003 | Dias et al. | |
| 6,578,113 B2 | 6/2003 | Krishnamurthy et al. | |
| 6,598,121 B2 | 7/2003 | Challenger et al. | |
| 6,643,672 B1 * | 11/2003 | Lebel | 707/206 |
| 6,658,462 B1 | 12/2003 | Dutta | |
| 6,658,463 B1 | 12/2003 | Dillon et al. | |
| 6,665,705 B1 | 12/2003 | Daniel-Barnes et al. | |
| 6,675,214 B2 | 1/2004 | Stewart et al. | |
| 6,741,970 B2 * | 5/2004 | Smith et al. | 705/26 |
| 6,751,608 B1 | 6/2004 | Cohen et al. | |
| 6,801,927 B1 * | 10/2004 | Smith et al. | 709/202 |
| 6,823,377 B1 | 11/2004 | Wu et al. | |
| 6,907,501 B2 | 6/2005 | Tariq et al. | |
| 7,103,794 B2 | 9/2006 | Malcolm et al. | |
| 2002/0004846 A1 | 1/2002 | Garcia-Luna-Aceves | |
| 2002/0004917 A1 | 1/2002 | Malcolm et al. | |
| 2002/0026511 A1 | 2/2002 | Garcia-Luna-Aceves | |
| 2002/0026560 A1 | 2/2002 | Jordan et al. | |
| 2002/0118835 A1 | 8/2002 | Uemura | |
| 2003/0004998 A1 | 1/2003 | Datta | |
| 2003/0120867 A1 | 6/2003 | Cuomo et al. | |
| 2003/0145112 A1 | 7/2003 | Keller et al. | |
| 2003/0149737 A1 | 8/2003 | Lambert et al. | |
| 2003/0163731 A1 | 8/2003 | Wigley et al. | |
| 2003/0172145 A1 | 9/2003 | Nguyen | |
| 2003/0233423 A1 | 12/2003 | Dilley et al. | |
| 2004/0044740 A1 | 3/2004 | Cudd et al. | |

OTHER PUBLICATIONS

"A Scalable Web Cache Consistency Architecture" by H. Yu, et al. Computer Communication Review, Asso. for Computer Machinery, NY, US. vol. 29, No. 4, Oct. 1999. pp. 163-174.

"Exploiting Metadata of Absent Objects for Proxy Cache Consistency" by J. Kim, et al. IEICE Tans. Comm., vol. E-84B, No. 5, May 2001. pp. 1406-1412.

* cited by examiner

Forward Proxy Configuration

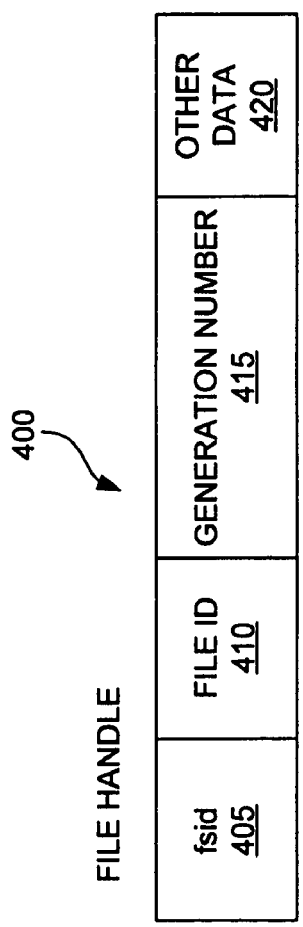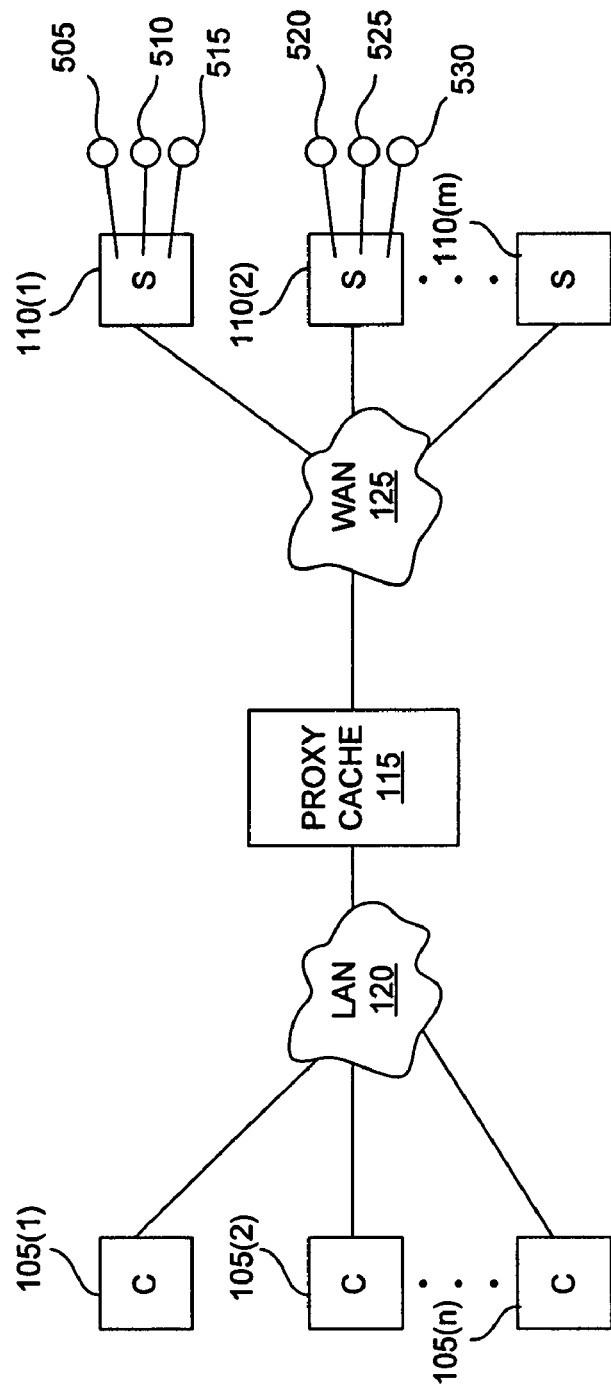

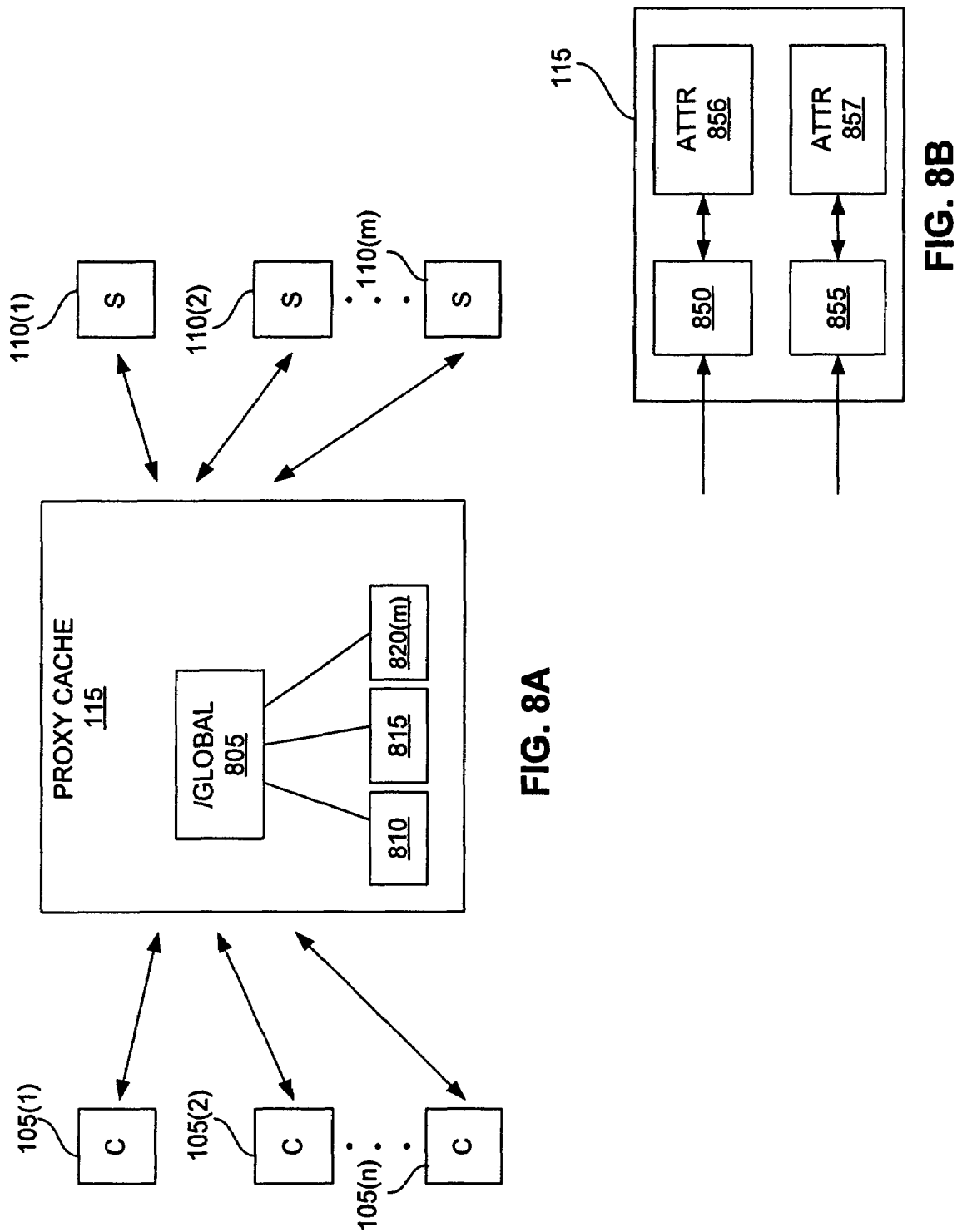

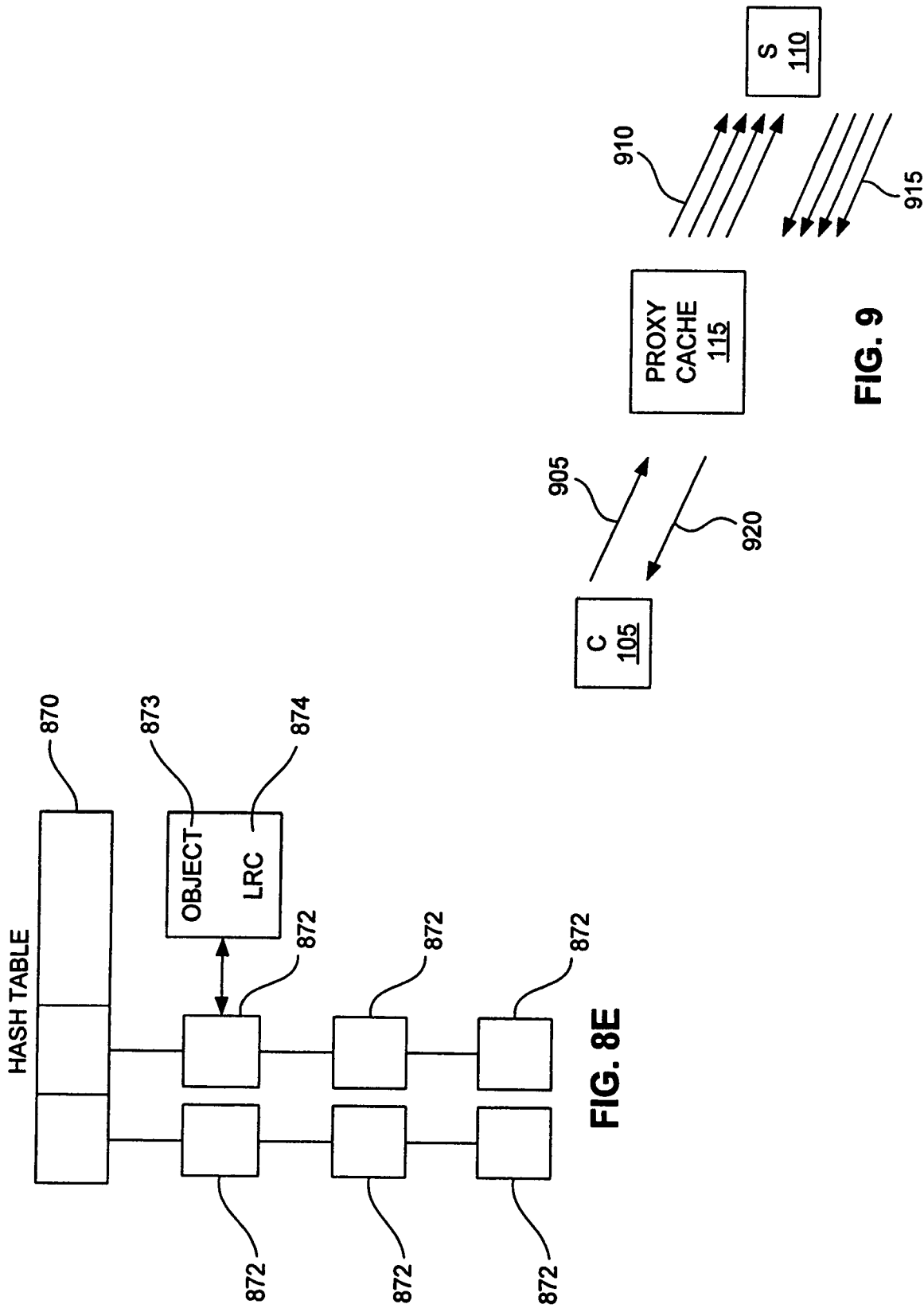

HISTORICAL LINKING

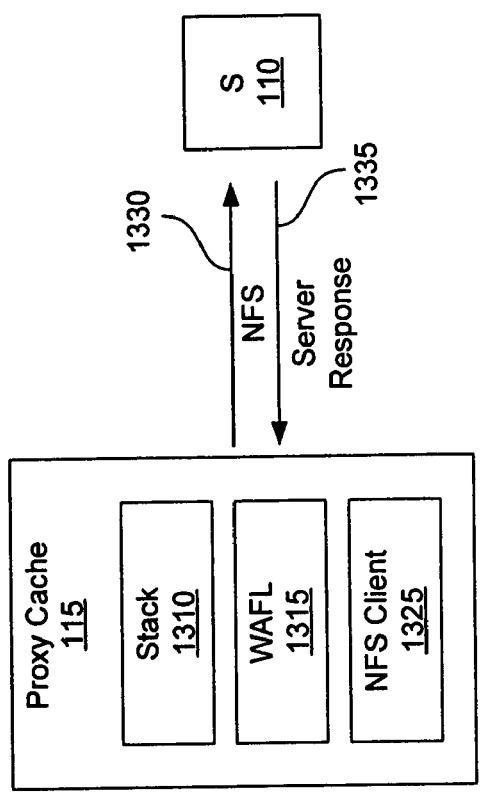
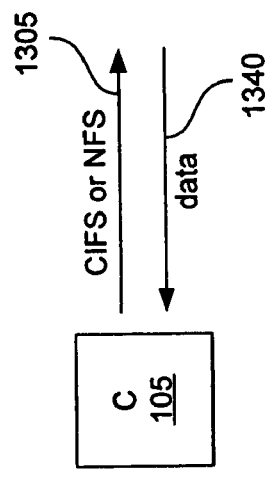
FIG. 14
CACHE MISS CONDITION
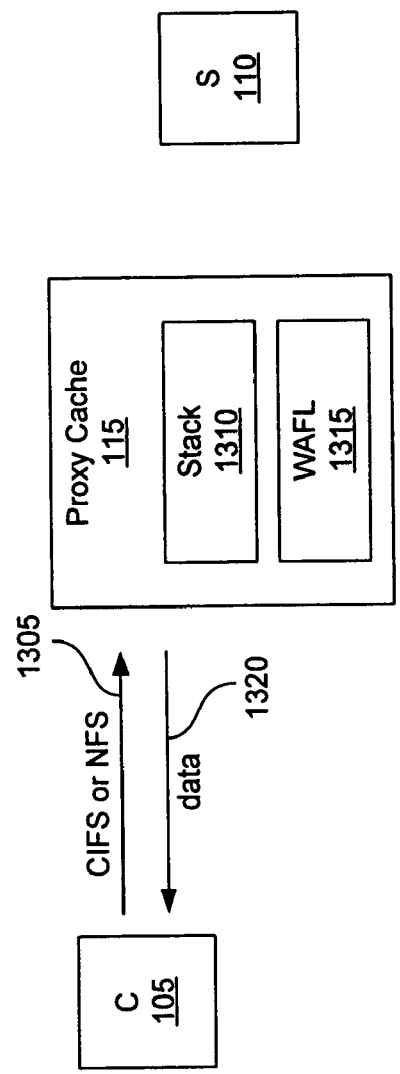
FIG. 13
CACHE HIT CONDITION

REVERSE PROXY CONFIGURATION

REVERSE PROXY CONFIGURATION

REVERSE PROXY CONFIGURATION

APPARATUS AND METHOD FOR PROCESSING DATA IN A NETWORK

TECHNICAL FIELD

Embodiments of the present invention relate generally to computer networks. More particularly, embodiments of the present invention relate generally to file systems and storage devices.

BACKGROUND

Large organizations are geographically distributed. They may have a few large central sites that have high-speed local area networks (LANs) where local data can be consolidated into a central area or system. However, large organizations may also have smaller remote offices, branch offices, or/and other edge locations that have lower bandwidth and higher latency connectivity to the centralized data repositories. The edge locations may not have information technology (IT) staffs to service local data needs such as, for example, backing up the servers or replacing failing hardware and/or software. Users at remote offices can typically see much poorer performance, reliability, and services from the corporate IT infrastructure than their counterparts at a central site.

Sharing data across large sites is also cumbersome. These sites are usually connected by dedicated high bandwidth links. However, the geographical distances between sites impose latencies that are unacceptable for many applications.

The current solution is to provide a file server (such as a filer from Network Appliance, Inc.) at each edge location and automatically back up the server to a central location over the wide area network (WAN). Read-only data that is shared across sites can be replicated by using asynchronous mirroring. Hypertext Transfer Protocol (HTTP) and streaming traffic can be cached using a network cache such as, for example, the NetCache appliance from Network Appliance, Inc.

Managing file servers at edge locations can be expensive in terms of cost and/or resource. The task of backing up data across WANs requires careful planning and administration. Replicating read-only volumes across WANs is often an overkill. In many cases, only a small percentage of the volume is actually used on a regular basis (e.g., /usr/local/bin). Typically, dynamic data sets (e.g., home directories of a user) cannot be replicated and must be managed independently at each location.

Therefore, the above-described products and approaches are limited to particular capabilities and features and suffer from a number of constraints.

SUMMARY OF EMBODIMENTS OF THE INVENTION

In one embodiment, the invention provides an apparatus for caching data in a network, with the apparatus including a proxy cache configured to receive request for an object from a client and to fetch data blocks from a server. The proxy cache may be configured to cache the data blocks in a hierarchical relationship within the object. The object may be, for example, a data file, a directory, or a part of a data file such as a data block. The data blocks that are cached in the proxy cache define an active data set which is based upon a request from a client.

These provisions together with the various ancillary provisions and features which will become apparent to those skilled in the art as the following description proceeds are attained by the devices, assemblies, and methods of embodiments of the present invention, preferred embodiments thereof being shown with reference to the accompanying drawings, by way of example only, wherein:

BRIEF DESCRIPTION OF THE DRAWINGS

Embodiments of the present invention are described with reference to the following figures, wherein like reference numerals refer to like parts throughout the various views unless otherwise specified.

FIG. 4 is a block diagram of a file handle.

FIG. 5 is a block diagram illustrating example volumes in each server.

FIG. 8A is a block diagram illustrating a local directory for permitting a virtual name space, in accordance with an embodiment of the invention.

FIG. 8B is a block diagram illustrating a method of creating multiple mount points where a set of attributes are associated with a mount point.

FIGS. 8C, 8D, and 8E are block diagrams of a method to provide consistency in cached data.

FIG. 9 is a block diagram illustrating the pre-fetching or pre-verification of attributes for data in a server, in accordance with an embodiment of the invention.

FIG. 13 illustrates a network system including a client, a proxy cache, and a server, for purposes of describing a cache hit condition in response to CIFS traffic from the client, in accordance with an embodiment of the invention.

FIG. 14 is a block diagram illustrating the operation for a CIFS request that results in a cache miss condition in the proxy cache, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1A:
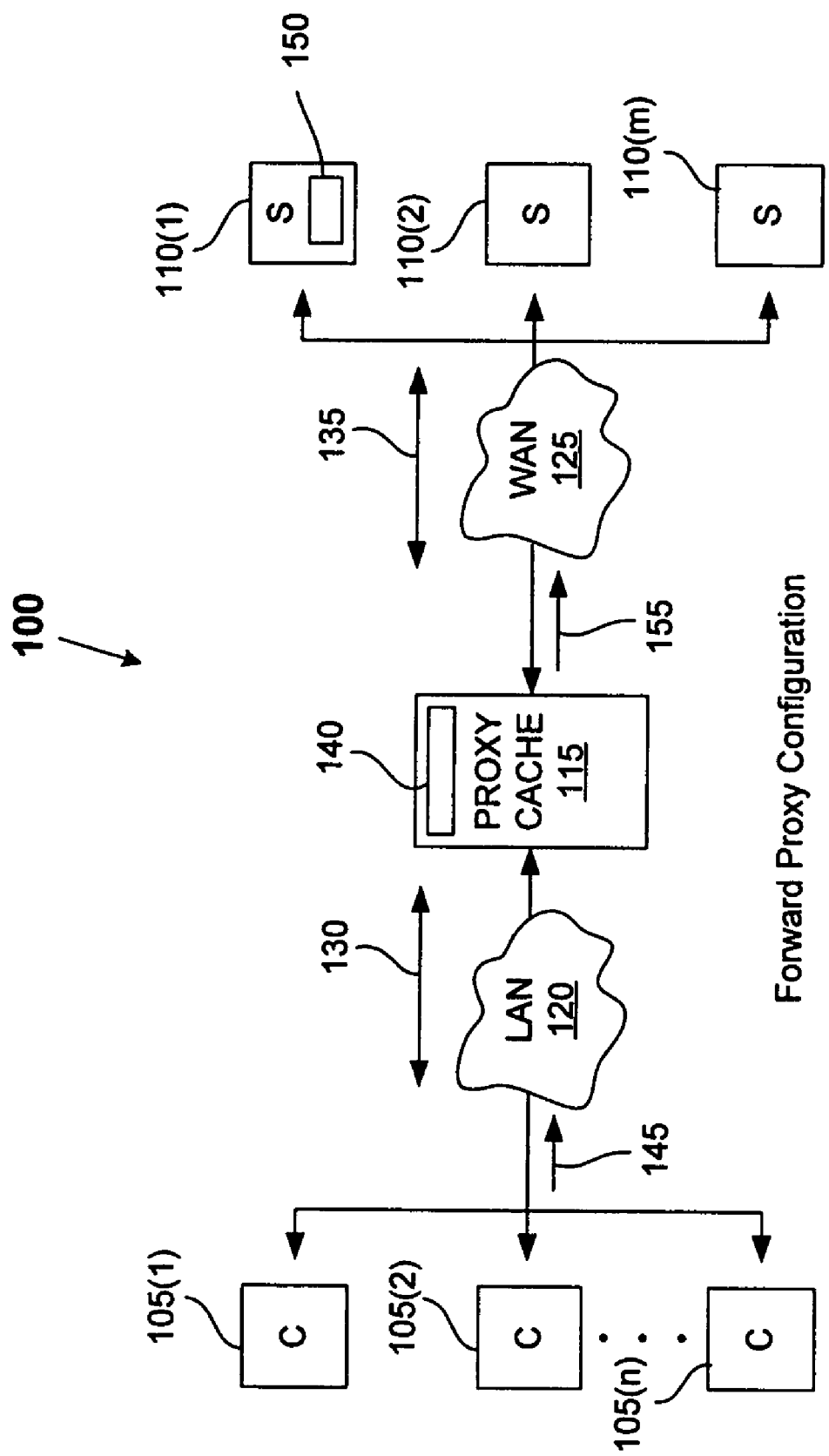
FIG. 1A is a block diagram of an apparatus in accordance with an embodiment of the invention.

FIG. 1A is a block diagram of a network 100, including client devices 105(1) to 105(n), servers 110(1) to 110(m), and a proxy cache (or proxy appliance) 115, with the components forming a forward proxy configuration in accordance with an embodiment of the invention. As described below, another embodiment of the invention provides a network including at least one proxy cache in a reverse proxy configuration. Embodiments of the invention include or provide at least some of the following features, as described below: (1) location independence and consolidation of name space; (2) on-demand sparse consistent replication of data; (3) load balancing; (4) remote disconnected access and modification of data; and/or (5) protocol transformation. These applications of virtualization make it possible to build a distributed storage infrastructure without incurring the prohibitive costs associated with conventional methods.

The above-variables n and m may be any suitable integer value. Thus, the number of client devices (generally referred herein as client(s) 105) and the number of servers (generally referred herein as server(s) 110) may vary. For example, the network 100 may be implemented with only one client device 105 and/or with only one server 110. The client devices 105 may be coupled via local area network (LAN) 120 to the proxy cache 115, while the servers 110 may be coupled via wide area network (WAN) 125 to the proxy cache 115.

The forward proxy configuration in FIG. 1A permits data to be cached on-demand by the proxy cache 115. Thus, on-demand sparse consistent replication of data is permitted by the proxy cache 115. This on-demand caching operation is more efficient than conventional replication techniques and advantageously does not require the special software that is used in conventional replication techniques.

In an embodiment, the proxy cache 115 and client devices 105 can communicate with each other via LAN 120 by use of an open standard protocol 130, such as the Network File System (NFS) protocol. As described below, the open standard protocol 130 may also be other suitable open standard protocols such as the Common Internet File System (CIFS) protocol. The proxy cache 115 and servers 110 can communicate with each other via Wide Area Network(WAN) 125 by use of an open standard protocol 135, such as NFS. By use of an open standard protocol along the WAN 125 and LAN 120, the special software required in conventional approaches is advantageously avoided in an embodiment of the invention. In particular, the clients 105 can now be heterogeneous by use of an open standard protocol such as NFS. In other words, the term heterogeneous clients means that clients from different manufacturers or vendors can be advantageously used. The clients will not require specialized software in order to communicate with the servers 110.

Additionally, the open standard protocol avoids configuration changes that would otherwise be required for the client devices 105 when the proxy cache 115 is installed in the network 100. Thus, a proxy cache 115 permits low overhead and cost with respect to network administration. Also, the proxy cache 115 may be administered or installed from a location remote from a server 110 or a client 105 in the network 100.

Typically, the proxy cache 115 can identify the servers 110 and clients 105 that are coupled to the proxy cache 115 and the particular data files that are in the servers 110.

As an example, if a client 105 requests data and the data is not in the proxy cache 115, then a "cache miss" would occur. On the other hand, if the requested data is in the proxy cache 115, then a "cache hit" would occur. These operations are described in detail below with reference to FIGS. 1B and 1C.

In the event of a cache hit, the proxy cache 115 will transmit the requested data to the requesting client 105. In the event of a cache miss, the proxy cache 115 will request the data from a server 110 and then provide the data to the requesting client 105. The data from the server 110 will be cached as an active data set 140 in the proxy cache 115 and is immediately available to the other clients 105. An active data set is an attribute of clients and their applications, and is cached data with reference for a given time period (or window of time). Thus, the active data set can differ depending on the given time period (e.g., an active data set for a given time period of 2 minutes may differ for an active data set for a given time period of 1 day or 1 week).

The proxy cache 115 permits collaborative sharing of cached copies of data among the clients 105. The collaborative sharing situation assumes that a particular data requested from the server 110 by a client 105 will also be likely requested by at least another client 105.

In an embodiment, the proxy cache 115 will cache an active data set 140, which is a set of recently requested or frequently requested data that has not been flushed from the proxy cache 115. The active data set 140 will be a subset of the data stored in the server(s) 110. When a client device 105 sends a read request 145 in order to read a particular copy 150 of a data file from a server 110, the read request 145 is received by the proxy cache 115 which checks if the particular part (e.g., data block) of that file or folder is cached locally in the proxy cache 115. If the requested particular data file is in the active data set 140, then a cache hit condition occurs, and the proxy cache 115 will transmit the requested data via LAN 120 to the requesting client device 105.

On the other hand, if a data block in the requested file is not stored as part of the active data set, then a cache miss condition occurs. As a result, the proxy cache 115 will send a request 155 to a server 110 to provide a copy of the missing data block in the requested data file.

In an embodiment, the cached file remains as part of the active data set 140, until the file is replaced in the active data set 140 by a suitable replacement strategy (such as, for example, a first-in-first-out management of data or the least recently used, LRU, algorithm). Of course, as described below, other data replacement strategies may be used with respect to management of the active data set 140, in an embodiment of the invention. For example, a file may be designated for permanent storage until a user of the client 105 issues a command to delete (flush) the file from the active data set 140.

Figure 1B:
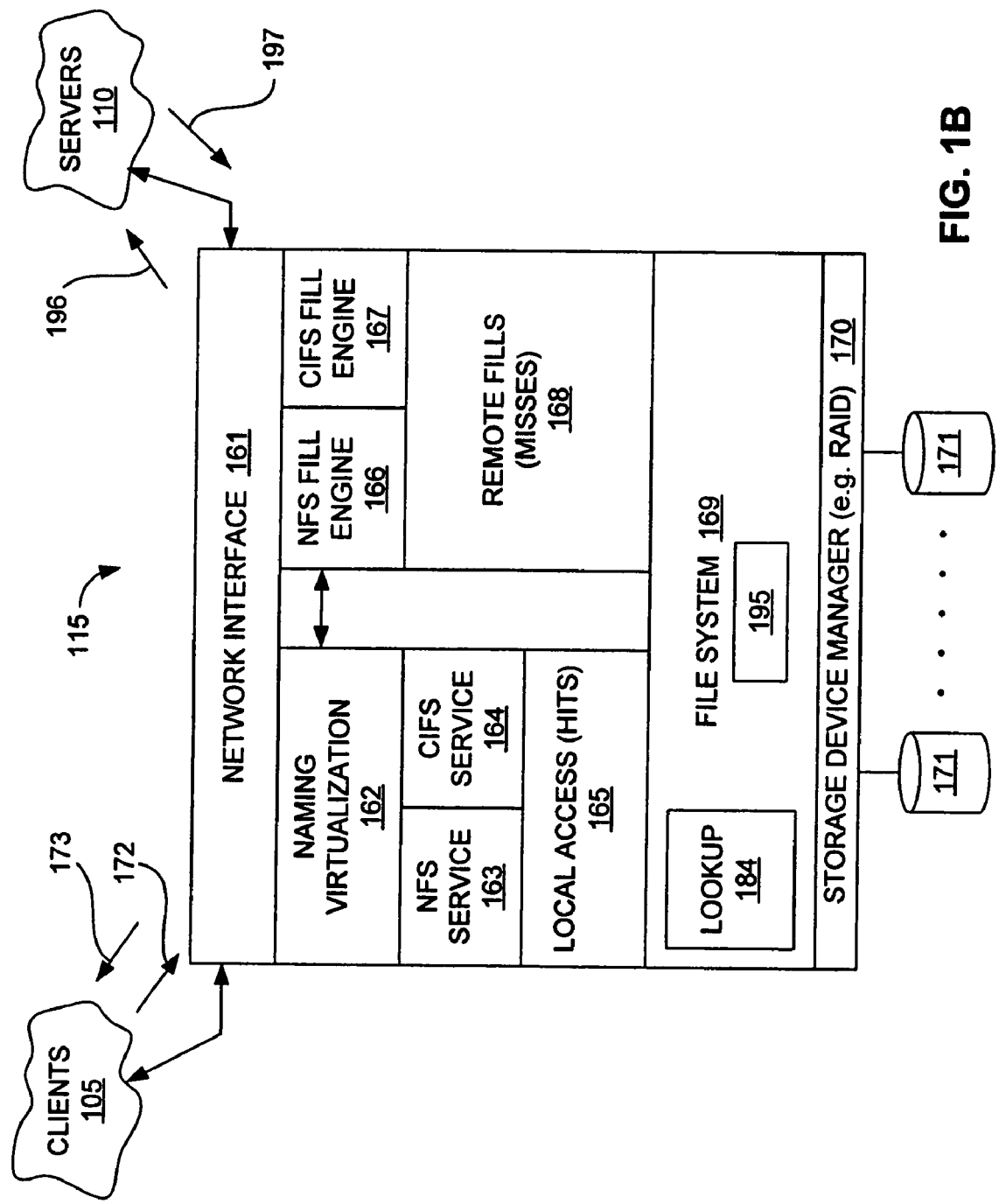
FIG. 1B is a block diagram of a proxy cache in accordance with an embodiment of the invention.

FIG. 1B is a block diagram of a proxy cache 115 in accordance with one embodiment of the invention. The proxy cache 115 includes a network interface 161, a naming virtualization layer 162, an NFS service 163 and/or CIFS service 164 (and/or or other service) for parsing IP-based network traffic (or other types of traffic for fiber channel, storage are network or the like), a local access layer 165, an NFS fill engine 166 and/or CIFS fill engine 167 and/or other suitable types of fill engines, a remote fills layer 168, a file system layer 169 (e.g., write-anywhere-file-layout or WAFL), a storage device manager 170 (such a Redundant Array Of Independent (or Inexpensive) Disks layer, i.e., a RAID layer), and storage disk(s) 171.

The network interface 161 includes components for receiving storage-related service requests from a client 105.

Generally, a file system can logically organize information as a hierarchical structure of directories and files on the storage devices (e.g., disks). Each file (on the disks) may be implemented as a set of disk blocks configured to store information, such as text, whereas the directory may be implemented as a specially-formatted file in which information about other files and directories are stored.

The storage device manager 170 manages the storage devices 171 in a storage system. The storage device manager 170 receives read and write commands from the file system 169 and processes the commands by accordingly accessing the storage system. The storage device manager 170 takes a block's logical address from the file system 169 and translates that logical address to a physical address in one or more storage devices 171 in storage system. In one embodiment, the storage device manager 170 manages storage devices in accordance with RAID (Redundant Array of Independent, or Inexpensive, Disks).

Generally, disk storage is typically implemented as one or more storage "volumes" that is formed by physical storage disks, defining an overall logical arrangement of storage space. Each volume is typically associated with its own file system, and the terms, volume and file system, will generally be used synonymously. The disks within a volume may be typically organized as one or more groups of RAID.

Figure 1C:
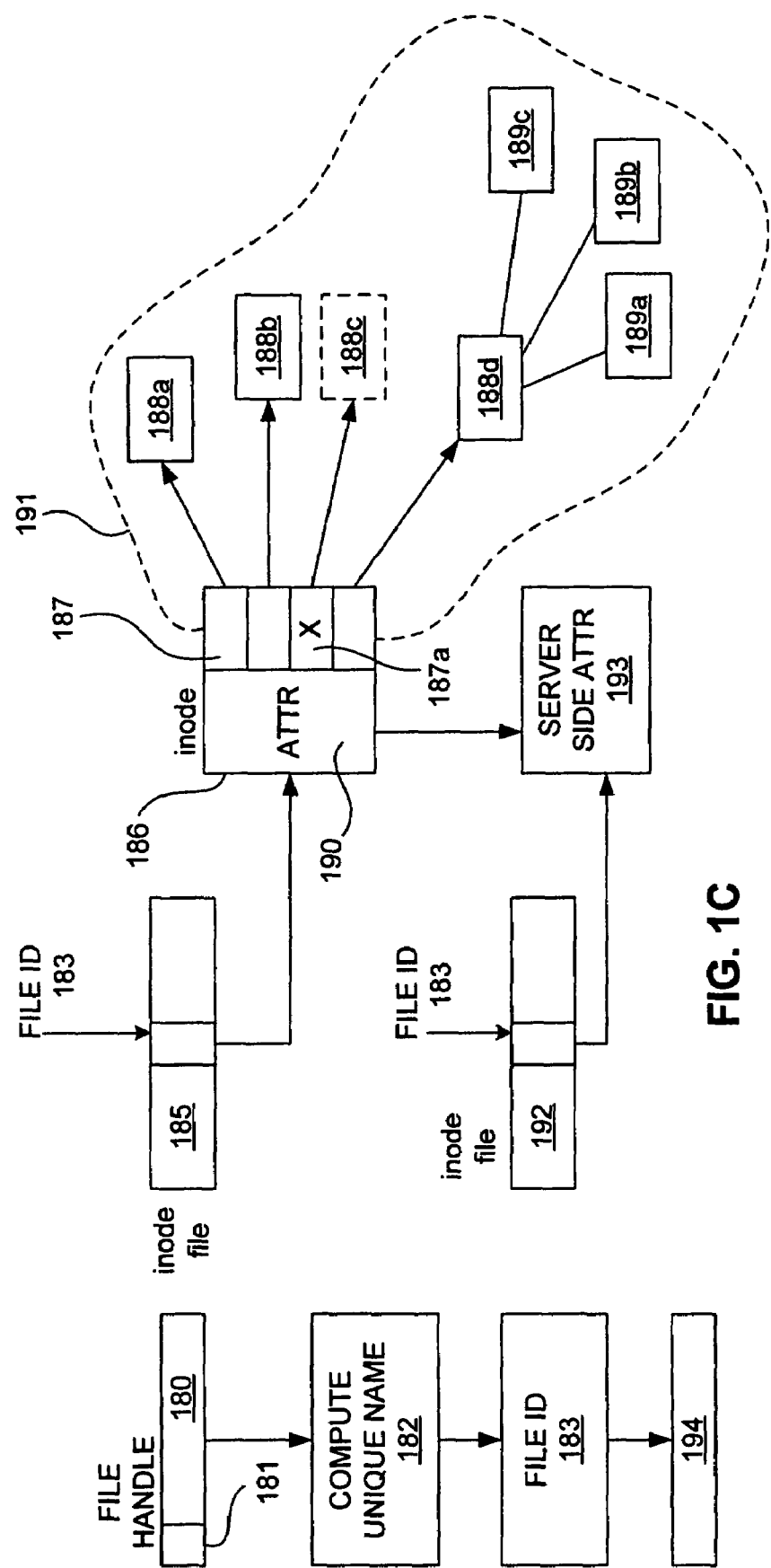
FIG. 1C is a block diagram illustrating a cache hit operation and a cache miss operation.

The functions for the other modules shown in FIG. 1B are described with references to FIG. 1C Cache Hit Reference is now made to the block diagrams in FIG. 1B and FIG. 1C to describe an operation of a proxy cache 115, in accordance with an embodiment of the invention. A file handle is used to name an object such as a file in a file system, and is described in additional detail below in with reference to FIG. 4.

Assume that a read request 172 is received by the proxy cache 115 (FIG. 1B) from a client 105, where the read request includes the file handle 180 having a value of, for example, FH="FILE1 ON CACHE". The network interface 161 will forward the read request to the naming virtualization layer 162, and the virtualization layer will map "FILE1" to a server file handle FH="FILE1 ON SERVER1" on a server 110 with an IP (Internet Protocol) address, 10.56.20.34, for example. Based on the file server identification (FSid) value 181 and the server IP address 10.56.20.34, the local access layer 165 will compute a unique name 182. In one embodiment, the algorithm for computing the unique name is the MD5 hash algorithm, which takes a message and converts it into a fixed string of digits, also called a message digest. It is also noted that the NFS service layer 163 or the CIFS service layer 164 serves the function of parsing the request 172, depending on whether the request is an NFS request or CIFS request.

Based on the unique name 182, the file system layer 169 will perform a lookup function in order to obtain a local cache file ID 183. In an embodiment, a module 184 in the file system 169 can perform this lookup function. If there is no matching local cache file ID, then a cache miss occurs, which is described further below.

The local cache file ID 183 is an index into an inode file 185 that points to an appropriate inode record 186. The inode record for an inode file 105 contains information describing the inode file associated with a given file system. Generally, an inode record is a data structure used to store information, such as metadata (attributes), about a file, whereas the file data blocks are structures used to store the actual data for the file. The information contained in an inode record may include, e.g., ownership of the file, access permission for the file, size of the file, file type and references to locations on disk of the data blocks for the file. The inode record 186 for the inode file 185 contains a pointer to a file system data block (e.g., WAFL data block), generally referenced as 188. A file data block is defined as a minimum addressable amount of data handled by the file system. A file data block is capable of storing, for example, 4 kilobytes (KB) of data. The inode record 186 can also point to indirect blocks which in turn can point to other file data blocks or other indirect blocks. For example, the indirect block 188$d$ points to blocks 189$a$, 189$b$, and 189$c$, each of which may be file data blocks or indirect blocks.

In particular, the inode numbers 187 in an inode record 186 points to the file data blocks or indirect blocks. It is also noted that an inode record 186 also includes attributes 190 of a file stored locally in the proxy cache 115. It is further noted that in one embodiment, the local cache file ID 183 is also an index into a second inode file 192 that points to an appropriate inode record 193 that contains server-side attributes for a file. Server-side attributes can include, for example, file system ID, file ID, block size, number of hard links, and space available on the file system. Of course, the second inode file 192 can be combined with the inode file 185. By creating the second inode file 192, the first inode file 185 will advantageously not require modification to perform some of the functions described with reference to FIG. 1C.

It is also noted that an inode record includes a file buffer tree which is a data structure used to represent a file on a disk in a file system. In FIG. 1C, the file buffer tree 191 is formed by the block numbers 187 and the blocks 188 and 189.

An iovector 194 is then formed, where the iovector is a list of block numbers 187 in the file buffer tree 191. A block number 187 will indicate if a file data block is present or absent for a particular file. In an embodiment, a module 195 can form the iovector 194 and determine the presence or absence of a file data block. In an embodiment, a block number 187 will have a special value X (where X can be, e.g., −1 or −3) as shown by block number 187a, where the special value X indicates that the local cache file stored in the proxy cache 115 does not have a requested data block.

In a cache hit condition, a block number will not have the special value X, and the iovector is sent to the storage device manager 170 (e.g., a RAID layer). The storage device manager 170 will provide a pointer to the appropriate storage device(s) 171 and send the requested data block to the file system and to the NFS service (in the case of an NFS request) which creates an NFS response 173 to the requesting client 105. The requesting client 105 can, therefore, receive the requested file. The method described above can also be used to process requests for directories.

The special value X in the list of block numbers permits the tracking of buffers (in the storage devices) in the proxy cache with missing data blocks for a requested file and thus permits the tracking of sparse data. The level of indirection (by calculation of the unique name 182) permits a file handle to point to a different slot in the inode file, depending on the particular time, since a data block or cache file may be flushed from the proxy cache 115.

Cache Miss

When the iovector 194 is constructed, and if a block number 187 in the file buffer tree 191 contains the special value X indicating that the requested file data block is absent from a buffer (in the storage devices 171), then a cache miss condition is triggered. Alternatively, a cache miss condition is triggered if a matching file ID 183 is not found by the file system 169 when performing the table lookup function after computing the unique name 182.

The NFS fill engine 166 for an NFS request 196 (or CIFS fill engine for a CIFS request) will request the absent file data block from the server 110 with the data block. In the example of FIG. 1C, the absent file data block is shown as dashed box 188c. The request is sent by use of the server file handle, "FILE1 ON SERVER1", in the example above.

When the file data block is fetched (197) by the NFS fill engine 166 from the server 110, the data block is filled into the storage disk 171 by the remote fills layer 168, file system 169, and storage device manager 170. The block numbers in the buffer tree 191 is then updated and a file data block is allocated. The file data blocks are then sent to the requesting client 105 so that the requested file is provided to the client. The method described above can also be used to process requests for directories.

It is further noted that the embodiment shown in FIG. 1C permits sparse caching of file data blocks in a buffer tree within one file. This method advantageously permits partial file operations to be performed such as truncating operations or write operations in the middle of the file.

Typically, when a client 105 sends a request in the NFS protocol, a separate request is made for each data block. It is also noted that a separate request in the CIFS protocol is made for each data block. As an example, assume that a first client 105 (e.g., client 105(1) in FIG. 1) sends a request for data in data blocks 188a and 188b, which are both cached in the proxy cache 115 in the example of FIG. 1C. It is noted that the number of request for data from a client may vary. Since the data blocks 188a and 188b are cached in the proxy cache 115 when the client requests were received by the proxy cache 115, as a result, a cache hit condition is triggered, and the requested data blocks 188a and 188b are transmitted to the requesting client 105(1) by the proxy cache 115.

As an example of a cache miss condition, assume that a second client 105 (e.g., client 105(2) in FIG. 1) sends a request for data in data blocks 188a, 188b, and 188c. As noted in the example of FIG. 1C, the data blocks 188a and 188b are cached in the proxy cache 115 when the client requests were received by the proxy cache 115, while the data block 188c is absent from the proxy cache 115. In response to the cache miss condition, the proxy cache 115 will fetch the data block 188c from a server 110, as similarly described above. The fetched data block 188c is allocated in the proxy cache 115 and then transmitted to the requesting client 105(2) by the proxy cache 115.

Assume as a further example that another client 105 (e.g., client 105(n) in FIG. 1) sends a request for data in data blocks 188b and 188c. Since data block 188c was previously fetched by the proxy cache 115 from a server 110 and allocated in proxy cache 115, the data blocks 188b and 188c are present in the proxy cache 115 when the client requests were received by the proxy cache 115. As a result, a cache hit condition is triggered, and the requested data blocks 188b and 188c are transmitted to the requesting client 105(1) by the proxy cache 115. If a client 105 requests for a data block 188 that is absent from the proxy cache 115, then the proxy cache 115 can fetch the absent data block 188 from a server 110 and cache the fetched data block 188 before sending the fetched data block 188 to the requesting client 105.

Thus, replication of a partial object occurs in the proxy cache 115 in response to a client request, where a partial object is defined as one or more blocks of data of a file. In the example above, the data block 188c was replicated in the proxy cache 115 in response to a client request and is subsequently available to other requesting clients 105. As discussed below, suitable data replacement policies may be used to flush (from the proxy cache 115) a data block 188 or a file defined by multiple data blocks 188. In contrast, currently known replication techniques replicate entire files (e.g., entire volumes or entire sets of files are replicated in various mirroring techniques).

Replacement Policies

Figure 2:
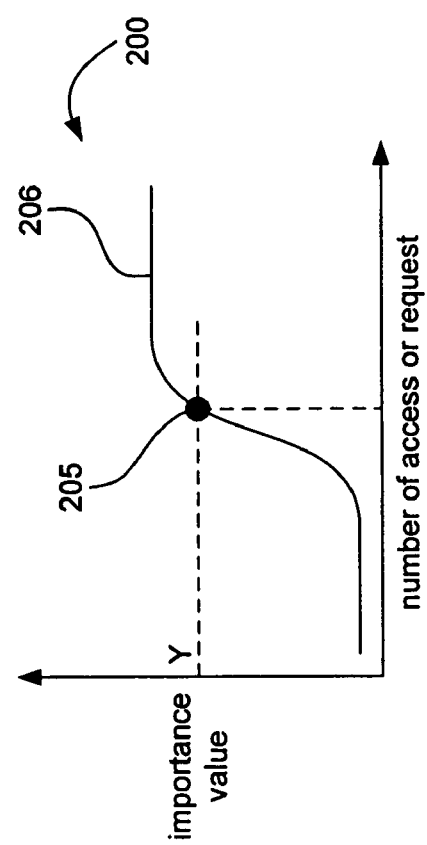
FIG. 2 is a block diagram illustrating a method of managing the active data set by use of an aging scheme or importance scheme, in accordance with an embodiment of the invention.

Various methods may be used as a replacement policy to refresh, retain, or flush data files in the active data set 140 from the proxy cache 114. FIG. 2 is a graph 200 which illustrates a method of increasing the importance of cached data in the active data set 140 based upon the number of access or request for the cached data from a client(s) 105. Thus, the proxy cache 115 can be configured to dynamically assign and adjust an "importance" value to a cached data in the active data set 140 based upon the number of access or request for the cached data from a client 105. As the number of access or request to the cached data increases, the proxy cache 115 will increase the importance value of the cached data. A cached data in the active data set may be prevented from being flushed from the storage unit of the proxy cache 115 if, for example, the cached data attains an importance value Y (as graphically shown by point 205 in the graph of FIG. 2). It is noted that the function 206 in FIG. 2 may have other graphical shapes such as a linear graph.

Figure 3:
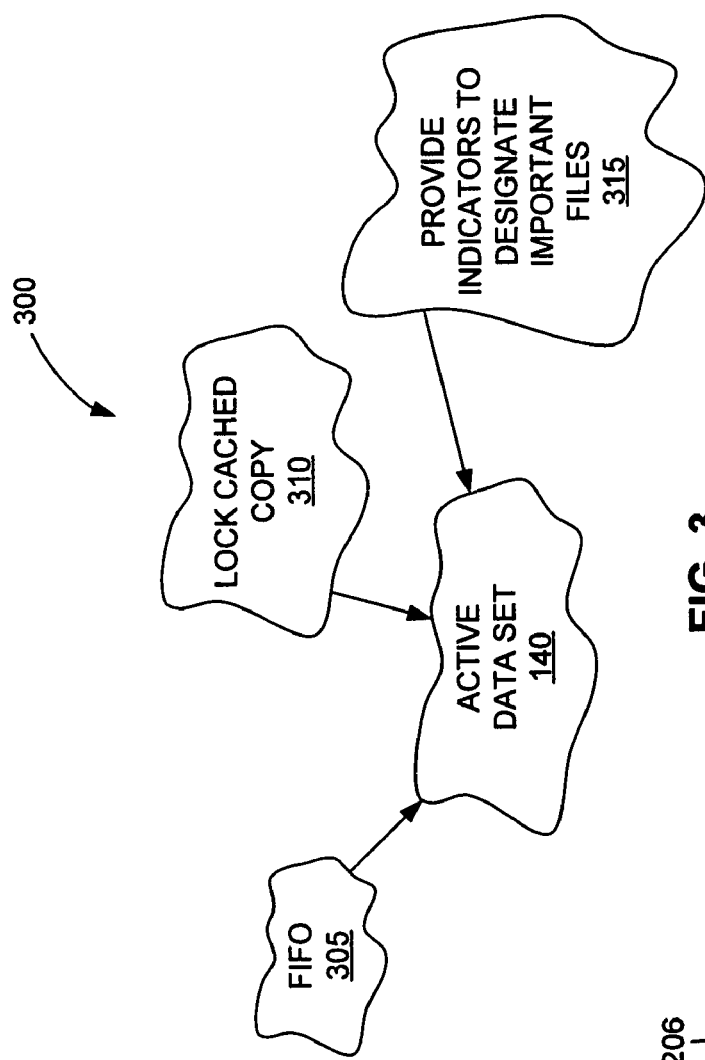
FIG. 3 is a block diagram illustrating other methods for managing the active data set, in accordance with embodiments of the invention.

FIG. 3 is a block diagram illustrating other methods 300 for managing the active data set 140, in accordance with embodiments of the invention. As mentioned above, an active data set 140 may be replaced or flushed from the proxy cache 115 by a suitable method such as first-in-first-out (FIFO) method 305. In the FIFO method 305, the active data set 140 is rotated for flushing from the storage units in the proxy cache 115. Other suitable replacement policies may be used such as the Least Recently Used (LRU) method. LRU refers to a replacement method, typically used in database management systems, where the block that has not been used for the longest time is the first to be replaced.

Alternatively or additionally, a file in the active data set 150 may be locked (310) by a user by sending a lock command to the proxy cache 115 from a client 105, so that the lock command prevents the file from being deleted in the proxy cache. The user may send a lock command if, for example, the user is concerned that the link connection to a server 110 may be broken or that the server 110 may fail. Alternatively, an attribute (metadata) of an object (e.g., file or data block of a file) may indicate how long an object is to remain cached in the proxy cache.

Alternatively or additionally, the user may provide (315) hints or indicators to the proxy cache 115 to designate particular cached files as important. As a result, the indicators will prevent the designated important files from being flushed from the storage unit(s) of the proxy cache 115.

By use of the proxy cache 115, data can be distributed and replicated at various remote locations and advantageously avoid the use of conventional mirroring techniques to replicate data. The use of conventional mirroring techniques requires that entire data sets are mirrored at a pre-determined time or interval (e.g., on a nightly basis) and requires disk spaces for the entire data sets. In contrast, the proxy cache caches 115 replicates data in the active data set 140 on-demand, and the active data set 140 advantageously eliminates the large disk requirements of previous methods for data replication. Additionally, the active data set 140 is automatically updated or flushed in response to a cache miss, and thus eliminates the special software requirements of previous methods for data replication.

Method of Consolidating the Mount Points and Re-Writing/Mutation of File Handles)

In order to perform operations via the NFS network file system protocol, a client sends NFS requests to the NFS server with: (1) an NFS file handle that specifies the target of the operation, (2) the operation (lookup, read, write, change permissions), and (3) the user on whose behalf the request is sent. When an NFS client wants to access a remote file system for the first time, the client first needs to obtain a root file handle, which is the file handle for an entry point into a volume (as noted above, the term "volume" is synonymous with the term "file system"). To this end, the client host sends a mount request to the server's mount daemon, where the mount request is part of the protocol for accessing a root file handle and a daemon is a program that runs continuously and exists for the purpose of handling periodic service requests that a computer system expects to receive. The daemon program forwards the requests to other programs (or processes) as appropriate. The server's mount daemon verifies that the client has permission to access the requested file system. When the mount daemon grants access, it sends a (directory) file handle back to the NFS client. Typically, the file handles are each, for example, 32 bytes of opaque identifier data. If a file name is changed, the file handle remains the same for that renamed file. Thus, the mounting process described above is a protocol to access a root file handle.

NFS file handles are not globally/universally unique, since two different servers could use the same file handles. Traditionally, this condition is not a problem, as clients keep track of which file handles are associated with each particular server. When a proxy cache 115 is used to consolidate mount points, it may export volumes from many different servers. Since these file handles are not unique, the proxy cache 115 may be unable to determine which file handle corresponds to which origin server, and this condition may result in a collision problem, since a first file in a first specific server and a second file in a second specific server may have identical file handles. The problem is exacerbated since the file handle is defined to be opaque, which means that typically the content of a file handle can not be determined and only the name of the file handle can be obtained.

In an embodiment of the invention, by mutating file handles before sending the file handles to the client 105, the proxy cache 115 is able to interpret file handles and determine the destination server 105 of any file handle. As a result, clients 105 can access data through a proxy cache 115 without an explicit knowledge of the particular server at which the data originates.

As shown in FIG. 4, a file handle 400 includes various fields such as an $FS_{id}$ (file system identifier) field 405, a file identification (ID) field 410, a generation number field 415, and a field 420 for other data. Typically, the $FS_{id}$ field 405 is about 4 to 8 bytes.

An embodiment of the invention allows for the virtualization of server-side file handles. By introducing a proxy cache 115 between clients 105 and servers 110, file handles can be mutated (translated) to allow for the construction of a uniform global name-space. File handles returned to clients can be changed to indicate that they map to different origin servers, different sets of export options, or that they cross mount points. By adding a layer of indirection between the file handle sent to a client and the file handle used to access the object on the origin server, changes to origin servers 110 can made without ever impacting the clients 105.

Figure 6:
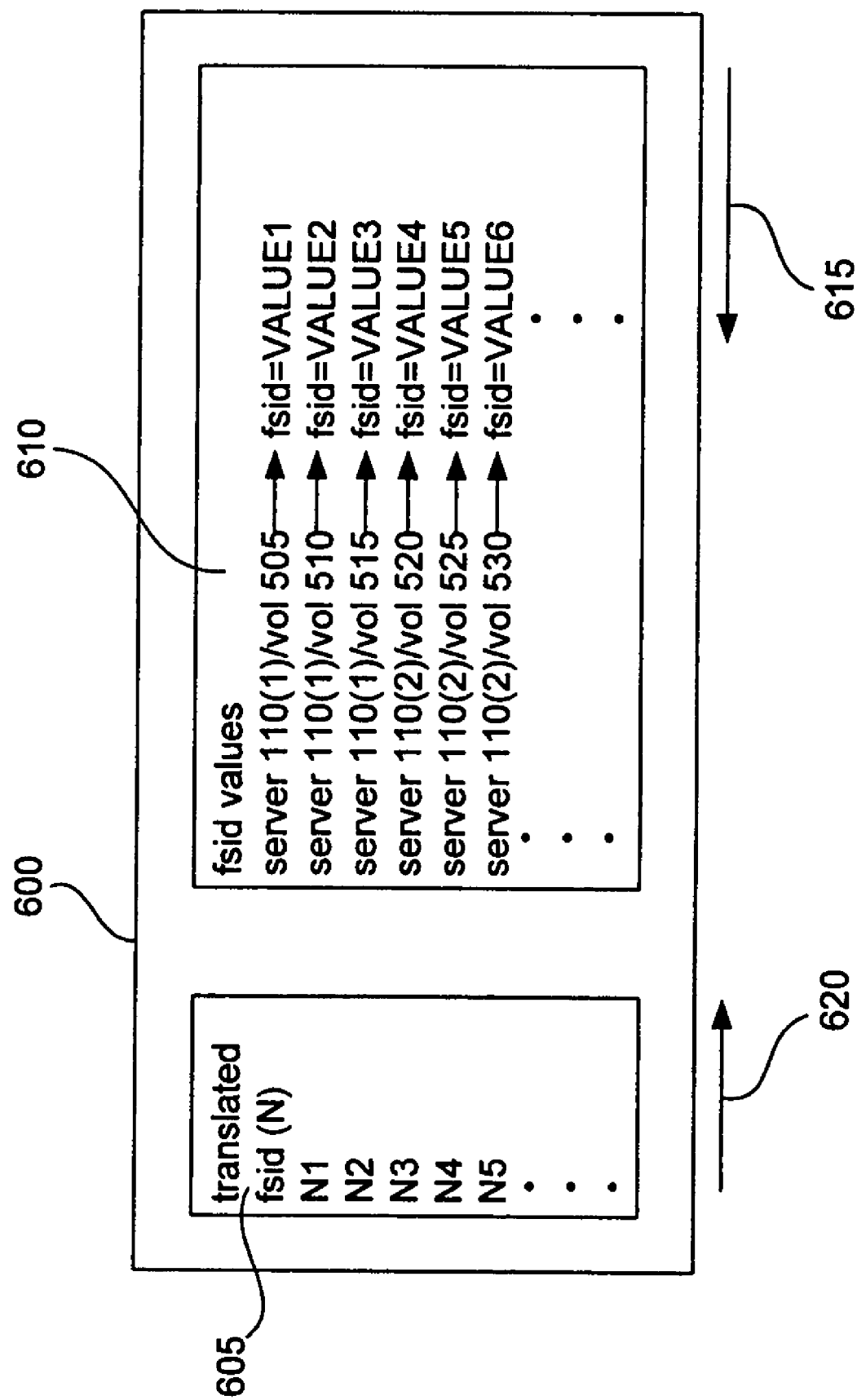
FIG. 6 is a block diagram illustrating a mapping of $FS_{id}$ values for each volume in a particular server, in accordance with an embodiment of the invention.

FIGS. 5 and 6 are diagrams that illustrate a method of consolidating the mount points and method of re-writing or mutation of file handles, in accordance with an embodiment of the invention. As shown in FIG. 5, each server 110 typically includes volumes (e.g., Vol/Vol1, Vol/Vol2, Vol/Vol3), where each volume represents a file system. Thus, the server 110(1) may include volumes 505 to 515, while the server 110(2) may include volume 520 to 530.

As shown in FIG. 6, a mapping 600 of $FS_{id}$ values can be made for each volume in a particular server 110 and the mapping 600 may be stored in the proxy cache 115, in accordance with an embodiment of the invention. The translation of every $FS_{id}$ value beneficially permits a determination of which server stores a particular file in response to a cache miss.

A translation table 605 contains hash values N (e.g., N1, N2, N3, . . . ), while an $FS_{id}$ table 610 contains $FS_{id}$ values for each volumes in the servers 110. When traffic 615 is received from a server 110 with a particular $FS_{id}$ value in the file handle (e.g., volume 505 in server 110(1) with $FS_{id}$=VALUE1 in the example of FIG. 6), then the $FS_{id}$ value=VALUE1 is translated into a translated $FS_{id}$ value N1 in table 605 in the proxy cache 115. Other $FS_{id}$ values from other received file handles from the servers 110 are stored in the table 610 and translated or mutated into different values N in table 605. Thus, when a file handle 620 is received from a client 105 (in the event of a client data request) and a cache miss occurs, then the proxy cache 115 uses the mapping 600 with the N values and the $FS_{id}$ values in table 610 to determine the particular server 110 and file/volume to direct the file handle 620. The translated $FS_{id}$ value N of the file handle 620 is converted by the proxy cache 115 into the appropriate $FS_{id}$ value from table 610 before sending the file handle 620 to the destination server 110.

A value N in table 600 is computed based on some hash that is based on the address of the server 110 with the volume and/or other identifiers. The hash for each N value is unique and thus avoids the name collision problem that was mentioned above. Typically, a value N may be an 8 byte number and may have a value set based on the server name, volume name and file name (e.g., filer1/Vol0/file0).

Alternatively, a value N may be calculated based on the server Internet Protocol (IP) address and the server file handle value by use of the MD5 algorithm as previously described above. Since the file handle value may not be unique across different servers, the server IP address can make each value of N distinct for files across different servers.

Figure 7:
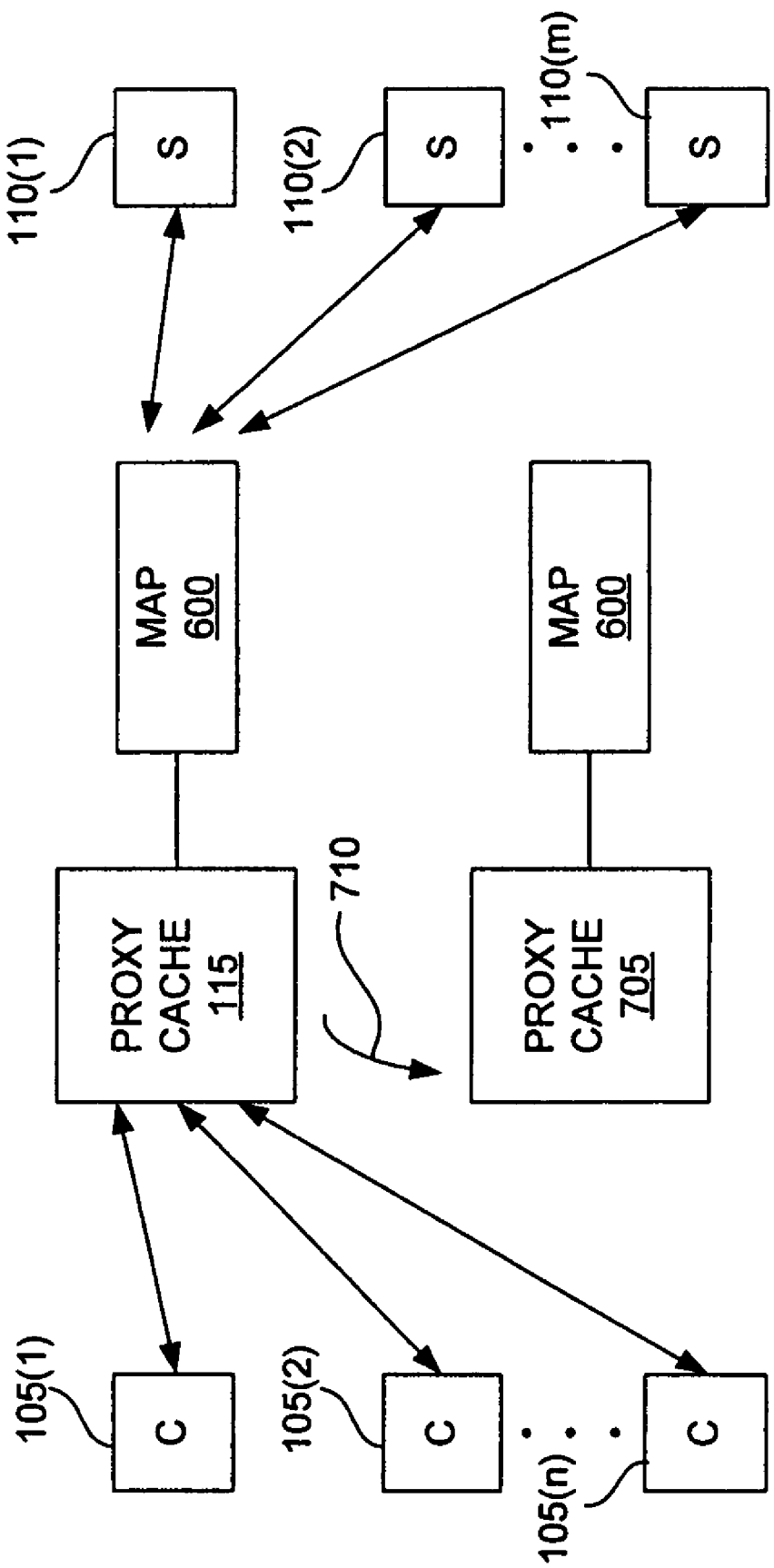
FIG. 7 is a block diagram of a network system including multiple proxy caches with identical mapped file handles, in accordance with an embodiment of the invention.

As shown in FIG. 7, the mapping 600 can be duplicated in various proxy caches (e.g., proxy caches 115 and 705). As a result, the mapping 600 will be available from other proxy caches if a particular proxy caches fails. For example, if clients 105 are no longer able to access the proxy cache 115 due to device failure, then a fail-over 710 can be performed to the proxy cache 705 so that the clients 105 can access the proxy cache 705 with the mapping 600 for re-writing of the file handles 400

Additionally or alternatively, since the mapping 600 can be duplicated into multiple proxy caches, a proxy cache (e.g., proxy cache 115) can be swapped with a new or another proxy cache (e.g., proxy cache 705) without requiring clients 105 to un-mount and re-mount their volumes and without requiring other changes in the clients 105.

Method of Creating and Using a Virtual Global Name Space

In addition to allowing for the consolidation of mount points as described above, an embodiment of the invention also provides for the creation of a uniform global namespace. Traditionally, NFS mount points can not be nested (i.e., if a client mounts an NFS volume, then that volume can not contain other mount points). This limitation makes the creation of a uniform view of a network very difficult.

Using virtualization of file handles in accordance with an embodiment of the invention, administrators can configure arbitrary directories in NFS exported volumes as mount points (access points to a file system). This means that clients 105 only need to mount one volume, but when they access this volume, the proxy cache will properly redirect the client requests to the particular appropriate volume. Thus, a proxy cache 115 can inform every client 105 about each server 110 (or new added server) by use of a single mount point. By renaming objects, a virtual global view of the files (i.e., virtual global name space) is created, and as a result, each client 105 has information about each server 110 and about each file in each server 110 by use of the virtual global view of the files. The virtual global name space leads to ease in administration of the clients 105.

As shown in FIG. 8A, multiple clients 105 can access a volume name 805 (in the proxy cache). An example volume name can be, "/global". The volume name 805 permits a virtual name space in accordance with an embodiment of the invention. A client 105 can mount the volume name 805 and view folders 810, 815, 820m associated with the servers 110(1), 110(2), and 110(m), respectively. Each folder 810, 815, and 820m will contain volume names assigned to particular servers. Thus, the volume name 805 points to server110(1)/vol505, server110(1)/vol510, server110(1)/vol515, server110(2)/vol520, server110(2)/vol525, server110(2)/vol530, and to other known volumes in the servers 110. Therefore, the folders 805-820m are virtually mapped to the mount point via volume name 805. The clients need only know about a single mount point (e.g., /global) to access the appropriate servers 110. The mapping 600 (see FIG. 6) is used to permit the file handles 400 to be virtual access points into volumes of servers 100, along with the re-writing of file handles in the NFS protocol. As mentioned above, the mount process involves communicating with the server to get the root file handle for the file system, which can later be passed to the lookup Remote Procedure Call (RPC) to locate other file handles in the remote file system directory hierarchy.

An advantage permitted by the single mount point is that the clients 105 need not be aware of every single mount points. In previous approaches, each client typically has an FStab file (file system table file), which lists all known remote file systems in folders (i.e., FStab is a list of local directories or folders in a client where the client can access a driver and server name and volume name). If a change occurs in a server 110, where the change affects the name space, then each client 105 will be required to be reconfigured so that the clients are able to access the servers, resulting in the complicated and time consuming mount point management tasks of the previous approaches.

In an embodiment of the invention, each client will only need to mount the directory 805 and this single consolidated mount point leads to simplified mount point management. In particular, the mount point is un-mounted and mounted on the proxy cache 115, and as a result, the volume name 805 will not require un-mounting and re-mounting on the clients 105. Thus, the directory 805 provides the function of a file system table file where clients can access drivers and servers. The directory 805 provides a list of access points to remote file systems and associated attributes as stored in a remote server(s) 110.

Method of Creating Multiple Mount Points where a Set of Attributes are Associated with a Mount Point.

A file handle can be re-written in different ways for the same object. In an embodiment, a file handle can be re-written in different ways based upon attributes of the associated local mount point on the proxy cache.

Reference is now made to FIG. 8B. A mount point is defined as a local volume name. As an example, the local volume name, user/read-only/employee1 (see block 850) and local volume name, user/employee1 (see block 855) will each yield two different file handles because the mount point for each local volume name differs. In particular, the mount point of user/read-only/employee1 850 is "user/read-only", while the mount point of user/employee1 855 is "user".

A local volume name can have associated attributes or metadata such as access restrictions, eligibility for storage or cachebility, security attributes, authentication, and authorization levels for proxy cache devices, as well as read-only or write-only attributes for servers. The attribute associated with the same data can be changed by accessing a mount point associated with another volume that shares the same data. Thus, particular attributes can be associated with a particular mount point or access point, which can be hashed to form a unique identifier. In an embodiment of the invention, the unique identifier is a hashing of a local volume name, file system ID, and server IP address by use of a suitable hashing algorithm such as MD5. In the example of FIG. 8B, the attribute(s) 856 is associated with the mount point 850, while the attribute(s) 857 is associated with the mount point 855.

It is further noted that the same physical object on disk in the proxy cache 115 can be accessed from the different mount points.

Method to Provide Consistency in Cached Data

We will first define the data consistency model guaranteed to NFS clients by a proxy cache. This model is the same as that guaranteed by NFS servers. We then explain how servers and proxy caches guarantee the NFS data consistency model. We then discuss how this data consistency model affects a collection of clients accessing and modifying data both through caches and directly to origin servers. Finally, we discuss a method of using of a cache max-age (i.e., the maximum amount of time during which hits will be served before the freshness is verified with the origin server) and explain how it affects data freshness and consistency. Although the examples described below are directed to the NFS protocol, this method for providing consistency in cached data may be used for other protocols as well.

NFS Client Data Consistency—From a client's point of view, the NFS consistency model guarantees serial ordering of file transactions. Once a transaction has completed and returned a particular version of a file, any transaction started thereafter for that same file is guaranteed to return a version at least as new or newer. We call this serial consistency. Understanding consistency in NFS is complicated by the fact that, for example, transactions span various amounts of time, can be pipelined, and depend on non-reliable transports. It is therefore useful to start by defining a few client concepts:

Transaction start—The start of an NFS transaction is defined to be the time at which the first request RPC (Remote Procedure Call) is sent by the client. Subsequent DUP requests (duplicate requests) do not reset the start of the transaction, where a DUP request is a duplicate of a previously made request under the NFS protocol. A DUP cache on a file server stores responses to requests from client as well as a transaction identifier (XID). Each NFS transaction has a unique XID (a request has a unique XID, while a response has an XID that matches the request). A duplicate request has the same XID as the original request.

Transaction end—The end of an NFS transaction is defined to occur when the client receives the first of potentially multiple DUP responses.

Serial Transactions—Two transactions are defined to be serialized if one completes before the other starts. Serial consistency is guaranteed for transactions only if they are themselves serialized.

File—On an NFS server, a particular file may be referenced by different file handles depending on the protocol version or export path used to access the file. In an embodiment of the proxy cache, a file is uniquely identified by a file handle. This implies that for cache clients, the same physical file imported on multiple mount points via different export paths or protocol versions may appear as multiple distinct files.

Consistency—A Server's Point Of View: A server typically does not know precisely when a transaction starts or completes on a client. It assumes that once it sends a response, it is received immediately by the client. When it receives a request, it assumes that it was initiated by the client after it received all previously sent responses. From the server's point of view, a transaction starts when the first request is received and ends when the first response is sent back.

Modifying operations should execute preferably only once on the server. Consider as an example a REMOVE operation. When it is first received by the server, the appropriate file is removed from the file system and a note of this is made in a DUP cache. Any future duplicate requests will be answered out of this DUP cache. This prevents duplicate requests from failing in case any prior responses were dropped on the way to the client.

Consistency In An NFS Proxy Cache: When a proxy cache sends a response out to a client, it must be able to guarantee that all requests received afterwards will be answered in a consistent way. This means that once a particular version of a file has been made known to a client, all future transactions for this file must return a version at least as fresh as the particular version.

From a proxy cache's point of view, this implies making two guarantees:

(1) At the time a response is sent to a client, the proxy cache preferably is prepared to serve a consistent response on future cache hits. This is currently accomplished by making sure that, on cache misses, data is filled before the response is sent to the client.

(2) When data is filled into the proxy cache, it can be used on subsequent hits if and only if the proxy cache can guarantee that no newer version of the file has already been served to the client. We call this consistent filling and discuss an embodiment below.

Handling Cache Reboots: When a proxy cache boots up, it runs in proxy-only mode while the in-memory object cache is rebuilt. In an embodiment, fills are not logged and an unclean shutdown could leave the cache in an inconsistent state. So on boot, the proxy cache marks all cached objects as needing to be verified before cache hits can be served off the cached objects. The proxy cache confirms with the server that the object is the latest available version by checking the attributes of the object before providing the object to a client in response to a client request.

On a reboot, the proxy cache aborts all transactions are aborted and transactions are restarted by the clients. Responses to cache-fill request en-route from servers will be dropped (discarded) by the proxy cache because their XIDs (transaction identifiers) will not be recognized (note that during reboot, typically a new XID mapping, for XIDs from subsequent requests, are created within the proxy cache, and hence the new XID mapping will not recognize the previous XIDs prior to the reboot occurrence). Following the reboot, any incoming client requests are treated as the first request of a new transaction. Restarting all transactions at boot makes it possible for the proxy cache to record the start time of all active transactions. This makes an embodiment of the invention of consistent fills possible.

Consistent Cache Fills: Typically, a cache fill may include either:

(1) Storing data returned by read-only operations.
(2) Replaying a modifying operation on cached data.

Because modifying operations are not typically always seen by the proxy cache or because they would typically be prohibitively hard to replay, it is sometimes necessary to toss a file from the proxy cache. A toss is simply a specific type of fill. For performance reasons, it is also sometimes useful to fill data which may be stale or may otherwise put the cached file in an inconsistent state (some NFS responses do not contain file attributes for all files referenced). In an embodiment of the invention, we handle this case by filling the data but marking the file as needing to be verified before a subsequent hit can be served from the cache.

To guarantee that consistent data is always sent to clients, all fills must be categorized in one of two ways:

(1) Consistent.
(2) Potentially Inconsistent.

A potentially inconsistent fill contains data which may be stale compared to that which was previously sent to a client. In NFS version 2, it is not always possible to know if a response contains fresh data. This type of response is a candidate for an inconsistent fill. Reordered responses from a server occurring at a time when their associated file(s) changed are also candidates. The proxy cache must typically be conservative in its approach and guess "stale" when it can not tell for sure. Inconsistent fills force the proxy cache to verify freshness with the origin server before subsequent hits can be served for the file in question. This is in contrast to consistent fills which can immediately be followed by straightforward cache hits.

In an embodiment, at boot, all transactions are restarted and all cached content is marked for verification. This guarantees that all cached data starts off as consistent. An inconsistent fill for a file F is defined to be one which results from a transaction which was started by the cache prior to the last recorded change for F. The last recorded change is defined to be the last time at which a server response indicating a potential change was received by the proxy cache. This is when the change became visible to clients of the proxy cache.

The proxy cache is preferably extremely conservative when keeping track of the Last Recorded Change for a file. When the proxy cache processes a response from a server, it updates the last recorded change for the files associated with the transaction if any of the following are true, for example:

The response is for an operation known to have modified the file.
The response does not include post-op attributes for the file (where a post-op attribute is an attribute of a file after an operation is executed on the file).
The response includes post-op file attributes and they are different than those currently cached.
There are no cached attributes for the file.
The cache is in the rebuild phase.

Our method for keeping track of the Last Recorded Change for each file is based on a hash table (see discussion below) keyed on unique file names (e.g., MD5 algorithm results). The files are typically reclaimed in an LRU. If a transaction is older than the oldest element in this LRU, we assume its last recorded change might have been reclaimed and we treat it as an inconsistent fill.

Distributed NFS Consistency: If all clients for a file system go through a particular proxy cache, they are always guaranteed to get the latest copy of the data. This is because all modifying operations will either be filled in the proxy cache, or cause the stale cached data to be tossed. More specifically, this is true if all modifying operations go through the proxy cache, no matter how read-only operations are routed.

When clients access a file system through different paths (some through proxy caches and others directly with the origin server) complications are introduced. A proxy cache may serve stale data to a client after a modifying operation has been committed directly with the origin server. It is important to note that while the proxy cache clients may get stale data, they however always get consistent data. To accommodate various tolerance for staleness by clients, a proxy cache allows a max-age to be specified for different data sets. This max-age is the maximum amount of time during which hits will be served before the freshness is verified with the origin server.

Figure 8C:
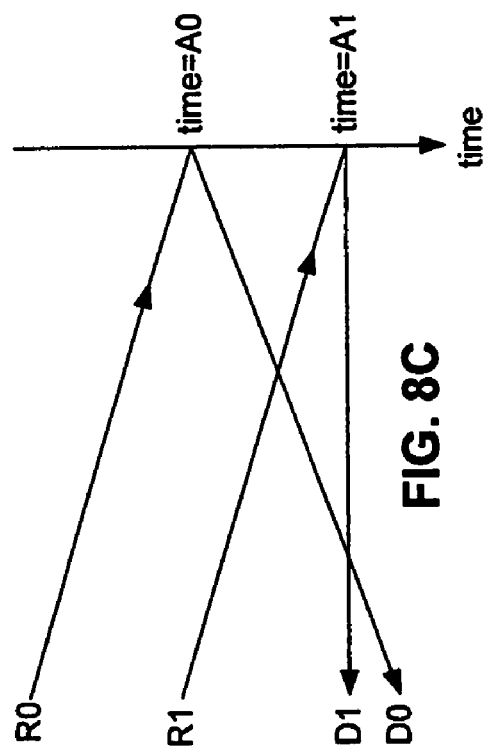

FIG. 8C shows a diagram of a case when a previous request R0 from the proxy cache is made to a server, and the request R0 is received by the server at time A0. A subsequent request R1 is then made by the proxy cache to the server, and the request is received at time A1. However, the data D0 in response to the request R0 is received by the proxy cache at a time subsequent to when the proxy cache received the data D1 in response to the request R1. Thus, it may be possible that the subsequently received data D0 is not the latest version of the file D.

Figure 8D:
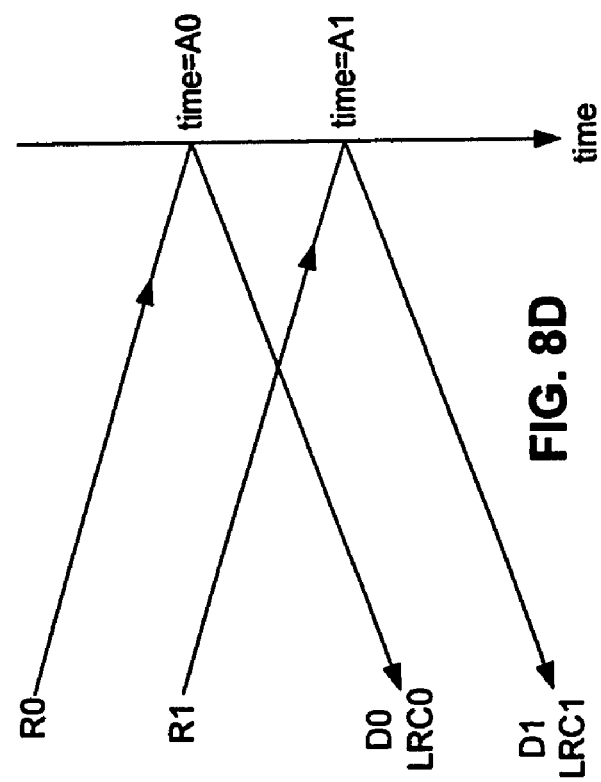

FIG. 8D shows a diagram of a case when a previous request R0 from the proxy cache is made to a server, and the request R0 is received by the server at time A0. A subsequent request R1 is then made by the proxy cache to the server, and the request is received at time A1. The data D0 in response to the request R0 is received by the proxy cache at a time prior to when the proxy cache received the data D1 in response to the request R1.

As shown in FIG. 8E, in an embodiment of the invention, a hash table 870 is stored in the proxy cache. The hash table will contain entries 872. Each entry will contain an object 873 (e.g., file or data block) and a last recorded change value 874. For example, the returned data D0 will have an attribute LRC0 indicating its last recorded change (when the object was last changed). Similarly, the returned data D1 will have an attribute LRC1 indicating its last recorded change. In an embodiment of the invention, if the LRC0 value of data D0 is greater than the time during which the R1 request was made by a pre-selected time (e.g., 30 seconds), then the proxy cache will make a request to verify the attribute of D1 to determine if D1 is the latest version of the data D. In an embodiment, the fill engine 166 in the proxy cache 115 will send, for example, a GETATTR command to the server to obtain the attributes of the data D. This method permits data consistency to be achieved for data that is stored in the proxy cache.

Pre-Verifying of Attributes by Pre-Fetching

In the HTTP protocol, the server typically gives to clients an indicator on when the clients need to check for file updates in the server. In contrast, the NFS protocol does not provide for the server to notify the clients to check for server file updates. The various pre-verification methods described below permits the proxy cache to verify the attributes for data stored in a server.

By use of the proxy cache 115, data can be consolidated over a WAN 125 when a server 110 and client 105 are separated via WAN 125 by a distance (e.g., the server 110 and client 105 are in different cities). The proxy cache 115 reduces the latency when the client 105 requests for data stored in the server 110, so that the server 110 will seem local to the client 105. In order to reduce this latency, embodiments of the invention provide solutions to make sure that an open protocol, such as NFS, are able to transmit efficiently over a WAN 125. Clients that use NFS typically sequentially request information about each file in a folder. By pre-fetching methods in accordance with an embodiment of the invention as described below, the latency of NFS over a WAN is advantageously reduced. As shown in FIG. 9, when a client 105 sends a request 905 for data and a cache miss occurs, the proxy cache 115 pre-fetches 910 the attributes for data in a server 910 and the server returns 915 the attributes so that the proxy cache 115 can determine any changes in the data. The proxy cache 115 can then send 920 the requested data to the client 105.

In an embodiment of the invention, data stored in the proxy cache 115 can be pre-verified for updates or changes by checking attributes of folders, subfolders, and/or files in the server (s 110). To obtain an attribute of an object in NFS (e.g., directory or file), the command GETATTR can be used (although other suitable operations can be used as well). The GETATTR command is used for each particular object and checks the attribute which indicates if the particular object has been modified. In an embodiment, NFS traffic can perform pre-verification of meta-data to accelerate the traffic.

Various pre-verification access patterns can be used such as, for example, sequential access, random access, access to historical-based linking of neighbor objects. Verification by sequential access means that the attributes of multiple objects are verified in sequence. A client pre-verification creates the historical-based link, clients benefit from the constructed historical links. The historical-based linking of neighbor objects is described below. Weights can also be added to a created link, depending on the client. Options can also be added to break links.

Figure 10:
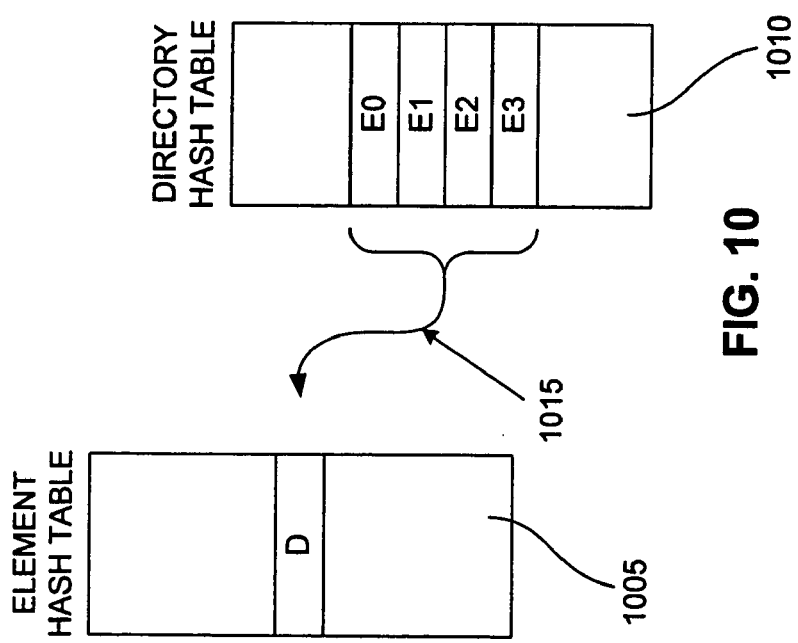
FIG. 10 is a block diagram illustrating components in a proxy cache for performing the pre-verification access, in accordance with an embodiment of the invention.

FIG. 10 is a block diagram to show components in the proxy cache 115 for performing the pre-verification access, in accordance with an embodiment of the invention. The object E0 may have an opaque file handle, and so there may be no way to find out the parent directory of the E0 object. An element hash table 1005 and directory hash table 1010 stored in memory of the proxy cache 115 include information for directory D. The first four elements (E0 to E3, for example) are loaded in the element hash table 1010. This method permits the creation of a link to the directory D and the capture of the sequence E0-E3 in a short period of time. The first four objects E0-E3 are hashed in table 1010 based on the file handle of object E0 file and predetermined neighbor objects E1-E3 and E0 will point (1015) to directory D in element hash table 1005. Objects E0-E4 are loaded, since a client 105 may request for object E1 or E2, instead of object E0. The object E0 entry has sufficient information about its parent directory D in the hash table 1005. When object E0 is loaded, a next pointer is marked, in order to assume that the next object will be E1. This pointer creates the sequential linking for an access pattern. By use of the linking method of FIG. 10, there is no need to determine the directory cookie ordering. Thus, the linking method maintains an ordering of operation per client 105. Preferably, the files that are loaded in table 1010 are not "hidden" files, where a hidden file requires known special techniques for viewing.

Figure 11:
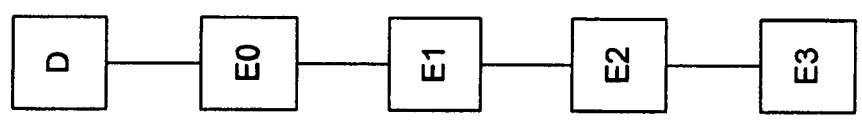
FIG. 11 is a block diagram illustrating a method of historical linking of verified objects, in accordance with an embodiment of the invention.

FIG. 11 is a block diagram illustrating a method of historical linking of verified objects, in accordance with an embodiment of the invention. An object is paired (linked) with a set of neighbor objects, if that object has been verified by a client. For example, a GETATTR D verification request from a client 105 will verify the object D. Since objects E0 and E1 are neighboring object, objects E0 and E1 are also pre-verified and are thus linked to object D.

The pre-verification of objects is particularly useful, since the GETATTR traffic in the NFS protocol typically causes a bottleneck in the network. By pre-verification of objects, the NFS traffic over a WAN is optimized. In contrast, previous approaches require transformation of the NFS traffic into a proprietary protocol to optimize the NFS traffic over a WAN.

Figure 12:
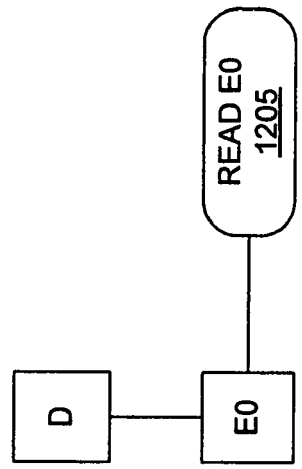
FIG. 12 is a block diagram, where a link is broken in response to a change in an attribute of an object, in accordance with an embodiment of the invention.

FIG. 12 is a block diagram, where a link is broken in response to a change in an attribute of an object. For example, if object E0 was pre-verified after a client 105 transmits a GETATTR E0 command, and a change in an attribute of the object E0 was detected, then the proxy cache 115 can proceed by reading the object E0 from the server 110 and cache the object E0.

Protocol Transformation (Request Transformation)

FIG. 13 illustrates a network system including a client 105, a proxy cache 115, and a server 110, for purposes of describing a cache hit condition in response to CIFS traffic from the client 105. Assume that the protocol used in the traffic between the client 105 and the proxy cache 115 is an open protocol such as the CIFS protocol, while the protocol used in the traffic between the proxy cache 115 and server 110 is the NFS protocol.

In an embodiment, the proxy cache 115 can translate the CIFS traffic from the client 105 into NFS traffic to the server 110 (and translate the NFS traffic from the server 110 into CIFS traffic to the client 105) at the file system level, instead of performing the translation at the protocol level. Thus, the proxy cache 115 permits CIFS clients to access data in an NFS server if there is a cache miss. Typically, the CIFS protocol is not practical for use over a WAN due to the serialized operations and greater number of operations in the CIFS protocol. Additionally, the CIFS protocol is less well-defined and optimization of the CIFS protocol for use over the WAN may result in violations of the protocol. In contrast, the proxy cache 115 can translate the CIFS traffic from a client 105 into NFS traffic to permit access to the server 110 if there is cache miss.

FIG. 13 is a diagram illustrating a cache hit condition for a CIFS request 1305 from a client 105. In response to the request 105, the stack 1310 queries a file system 1315 (e.g., a Write-Anywhere-File Layout or WAFL) and if the file system 1315 has the requested data, then the file system 1315 will pass the requested data 1320 to the stack 1310. The stack 1310 would then send the requested data 1320 to the requesting client 105. It is noted that a similar operation occurs if an NFS request is received by the proxy cache 115 from a client during a cache hit condition.

FIG. 14 is a block diagram illustrating the operation for a CIFS request that results in a cache miss condition in the proxy cache 115. In response to the request, the stack 1310 queries the files system 1315 for the requested data. Since the requested data is not in the file system 1315, the file system 1315 sends a query to an NFS client module 1325 (the module is typically implemented in code and executed on the client) which then sends an NFS request 1330 over the WAN to the server 110. In response to the NFS request 1330 from the proxy cache 115, the server 110 sends (1335) the requested data via the NFS protocol across the WAN to the NFS client module 1325. The NFS client module 1325 will then send the requested data to the file system 1315, and the file system 1315 passes the requested data to the stack 1310. The stack 1310 would then send the requested data 1340 to the requesting client 105.

Figure 15:
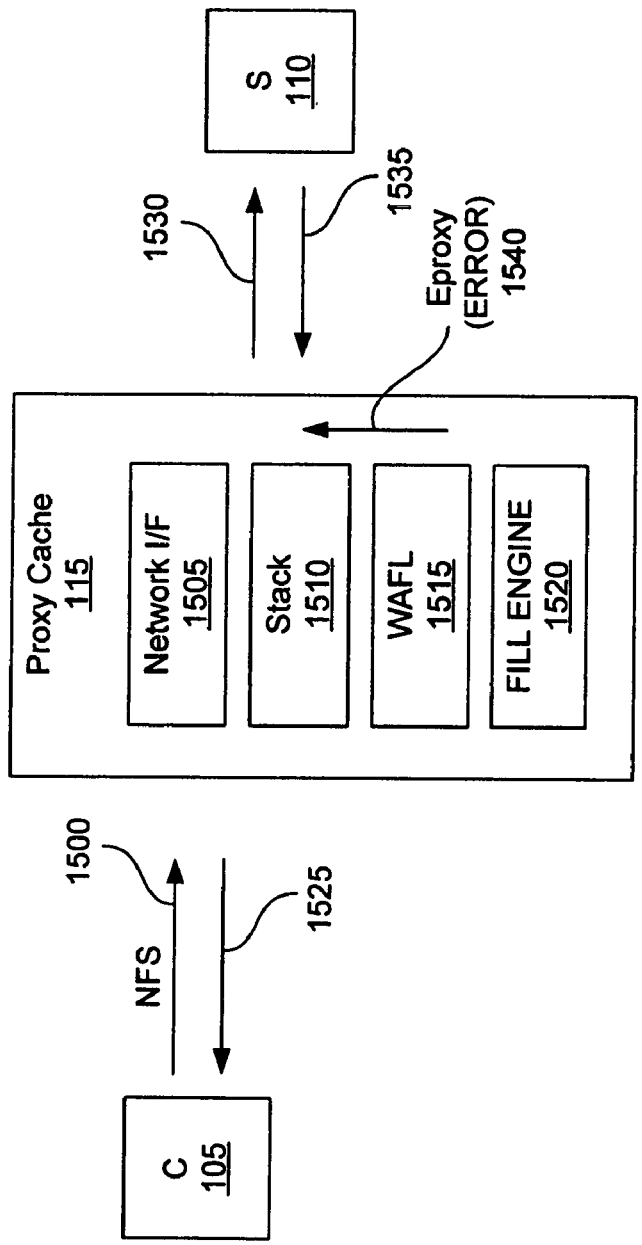
FIG. 15 is a block diagram illustrating the operation for an NFS request that results in a cache miss condition in the proxy cache, in accordance with an embodiment of the invention.

FIG. 15 is a block diagram illustrating the operation for an NFS request 1500 that results in a cache miss condition in the proxy cache 115. The stack 1510 will check the file system 1515 for the requested data. In response to a cache miss, the proxy cache 115 sends an NFS request 1530 from the network interface 1505 to the server 110. The fill engine 1520 parses the server response 1535 and uses a data structure that permits communication between clients 105 and servers 110 and the opaque feature of the file handles. The requested data 1525 is allocated in the proxy cache 115 and then sent by the proxy cache 115 to the client 105.

Delay Writes

Figure 16:
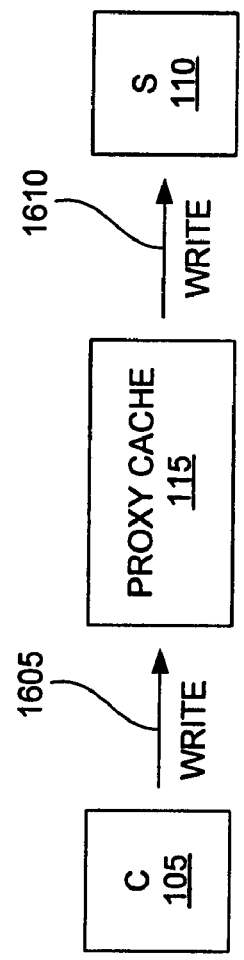
FIG. 16 is block diagram illustrating a network in accordance with an embodiment of the invention for purposes of describing a delay write operation.

FIG. 16 is block diagram illustrating a network in accordance with an embodiment of the invention for purposes of describing a delay write operation. The proxy cache 115 is configured to perform delayed sparse write operations 1610 to the server 110 in response to a write operation 1605 from a client 105. As an example, if the client 105 is performing a write operation 1605 to the proxy cache 115, then proxy cache 115 can write the data to the server 110 to modify the files in the server 110. The write operation 1610 can be performed as a background operation of the proxy cache 115 or can be performed at a later time. Thus, the write data is sent to the local disk in the proxy cache first and write operation to the remote server may be delayed.

In an embodiment, the proxy cache 115 can serve as a staging area and can buffer the write data prior to performing the write operation 1610. The write operation 1610 can be performed at a rate slower than the rate of write operation 1605. Additionally or alternatively, the write operation 1610 can be performed at a delayed time or at a time subsequent to the write operation 1605. Thus, if the WAN connecting the proxy cache 115 and server 110 fails or if a planned-disconnect occurs between the proxy cache 115 and server 110, then the proxy cache 115 can perform the write operation 1610 to the server 110 at a later time when the WAN becomes operational. This delayed write feature insures that the write data is eventually stored in the server 110, without slowing down or affecting the operation of the client 105. Thus, an embodiment of the invention avoids the need for conventional software for copying data, since the write operation 1610 to the server 110 is typically performed automatically.

The write operation 1605 may be permitted to invalidate non-read-only data stored in the proxy cache 115. Additionally, write data that is cached in the proxy cache 115 does not require a deletion action, since the write data will be subsequently flushed from the proxy cache 115 by use of, for example, a FIFO operation as described above.

The delayed write operation from the proxy cache 115 to the server 110 may be performed: (1) right away, (2) based upon a schedule, (3) during idle times in the network, and/or (4) based upon bandwidth limitations (e.g., perform the write operation during a time when there is maximum network bandwidth available). Reservation rate control can be made to limit bandwidth traffic to proxy cache 115. Specifically, bandwidth can be limited or managed by prioritizing based on various factors, such as, for example: (1) client IP information (layer 4 TCP/IP layer information), (2) NFS information (layer 7) (e.g., user ID, operation types such as read or write, or (3) particular files (e.g., one particular directory may have higher priority than other directories). Thus, bandwidth can be prioritized based upon the type of client that is sending the request or based on other factors as mentioned above.

Methods of using delegation (which gives a proxy cache the only permission or right to modify an object in a server) is described below in FIG. 18. Delegation techniques are supported by CIFS and NFS version 4.

Figure 17:
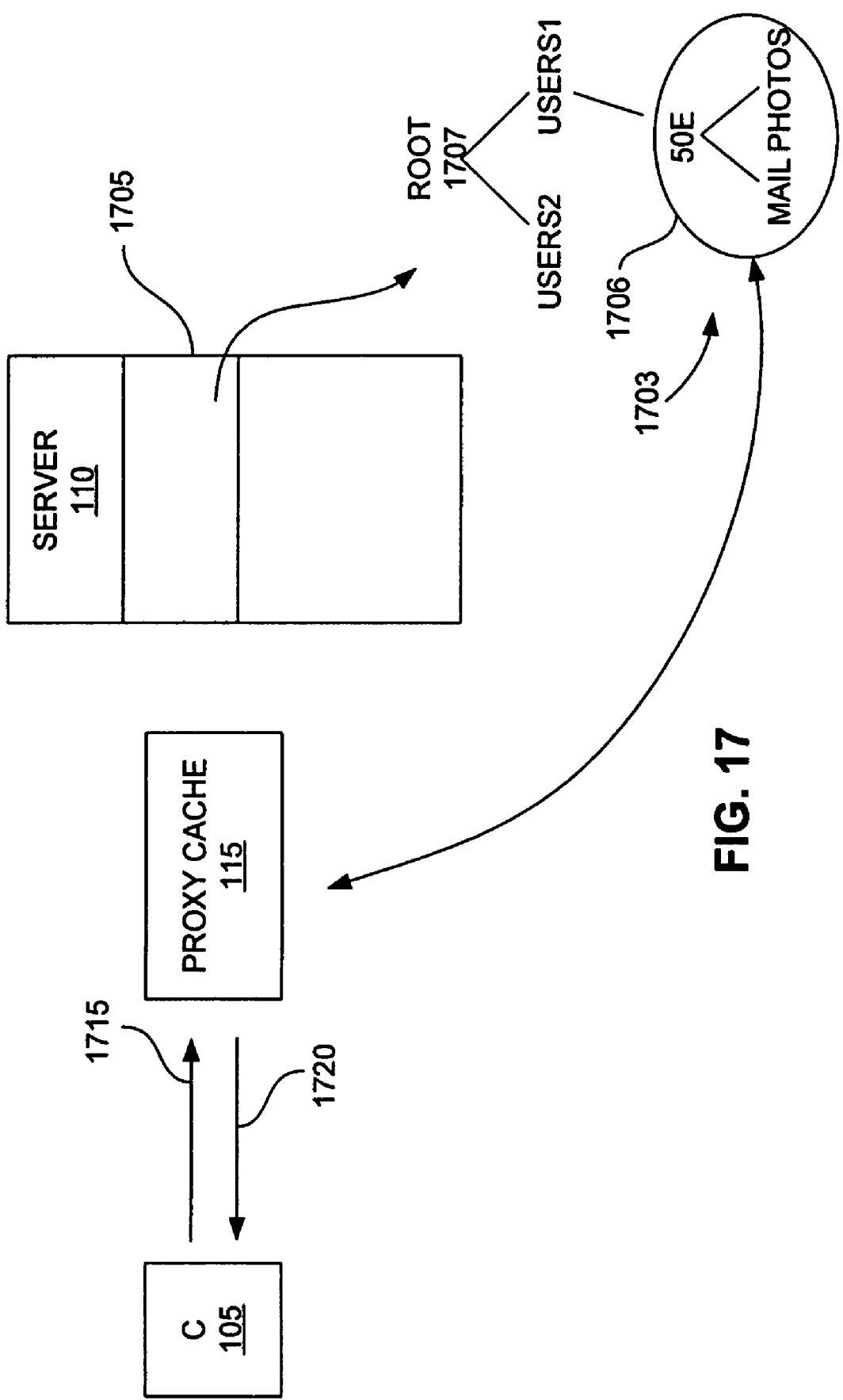
FIG. 17 illustrates an embodiment of a proxy cache configured to cache an active data set that includes cached copies of particular logical copies of data in pre-determined memory area of the server.

FIG. 17 illustrates an embodiment of a proxy cache 115 configured to cache an active data set that includes subparts 1703 of a file system 1705 in a server 110. For example, the subparts may be a subtree 1706 under a root 1707 and file users1. The subtree 1703 may be fetched by the proxy cache 115 from the server 110 prior to a planned disconnect between the proxy cache 115 and server 110 so that required or particular data are always available for a client 105 to access in the proxy cache 115. As an example, the proxy cache 115 may be configured to the subtree 1706 in the server 110 prior to a planned disconnect operation. Thus, the proxy cache advantageously provides a method to replicate data without using the mirroring techniques of conventional approaches.

In one embodiment, the original cached copy of the data in the proxy cache 115 is not replaced with the new updated data from the server 110 until all of the data has been retrieved from the server 110. The replacement of data in the proxy cache 115 may occur at the directory level or file level.

The above-mentioned virtualization of name-space enables the pre-verification of objects in the server 110.

Delegation

Figure 18:
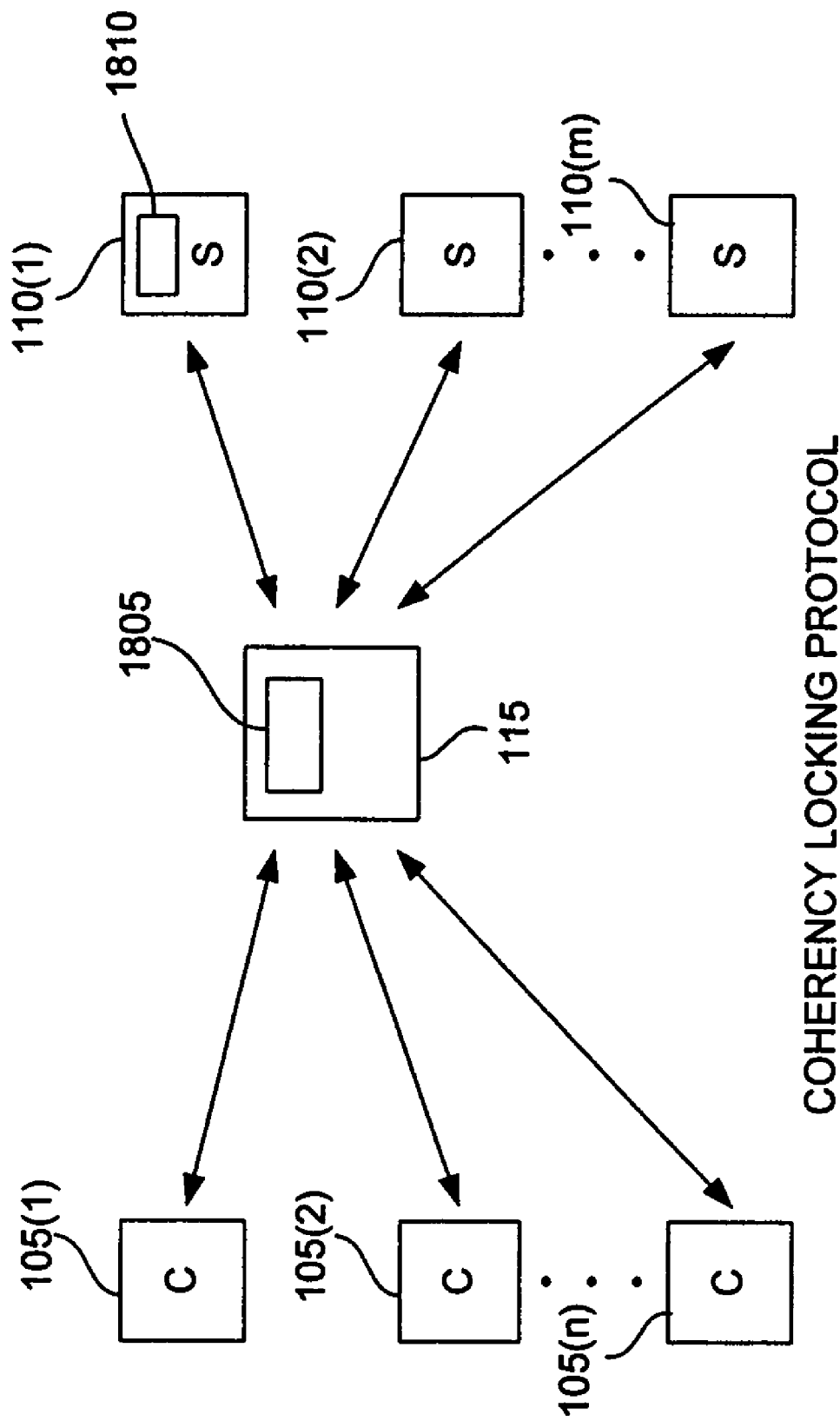
FIG. 18 is a block diagram of a system for providing data coherency, in accordance with an embodiment of the invention.

FIG. 18 is a block diagram of a system for using delegation, in accordance with an embodiment of the invention. Assume that the server 110(1) contains a copy 1810 of a subdirectory or file(s), and the proxy cache 115 contains a cached copy 1805 of the data in the logical copy 1810. The cached copy 1805 in this instance would be included in the active data sets in the proxy cache 115. A server 105 can grant a "lock" of the logical copy 1810 to the proxy cache 115, and as a result, the proxy cache 115 can serve cache hits without the requirement that the proxy cache 115 checks the server 115 for file updates in the logical copy 1810. Any file updates that occur for the logical copy 1810 in the server 110(1) will cause the server 110(1) to inform the lock owner of the file updates. If a proxy cache 115 has a lock to a file in a server, then any write request to the file will typically go through the proxy cache 115 and a delayed write operation to the file may subsequently be performed by the proxy cache. The lock owned by the proxy cache 115 may be subsequently revoked by the server.

Clustering

Figure 19:
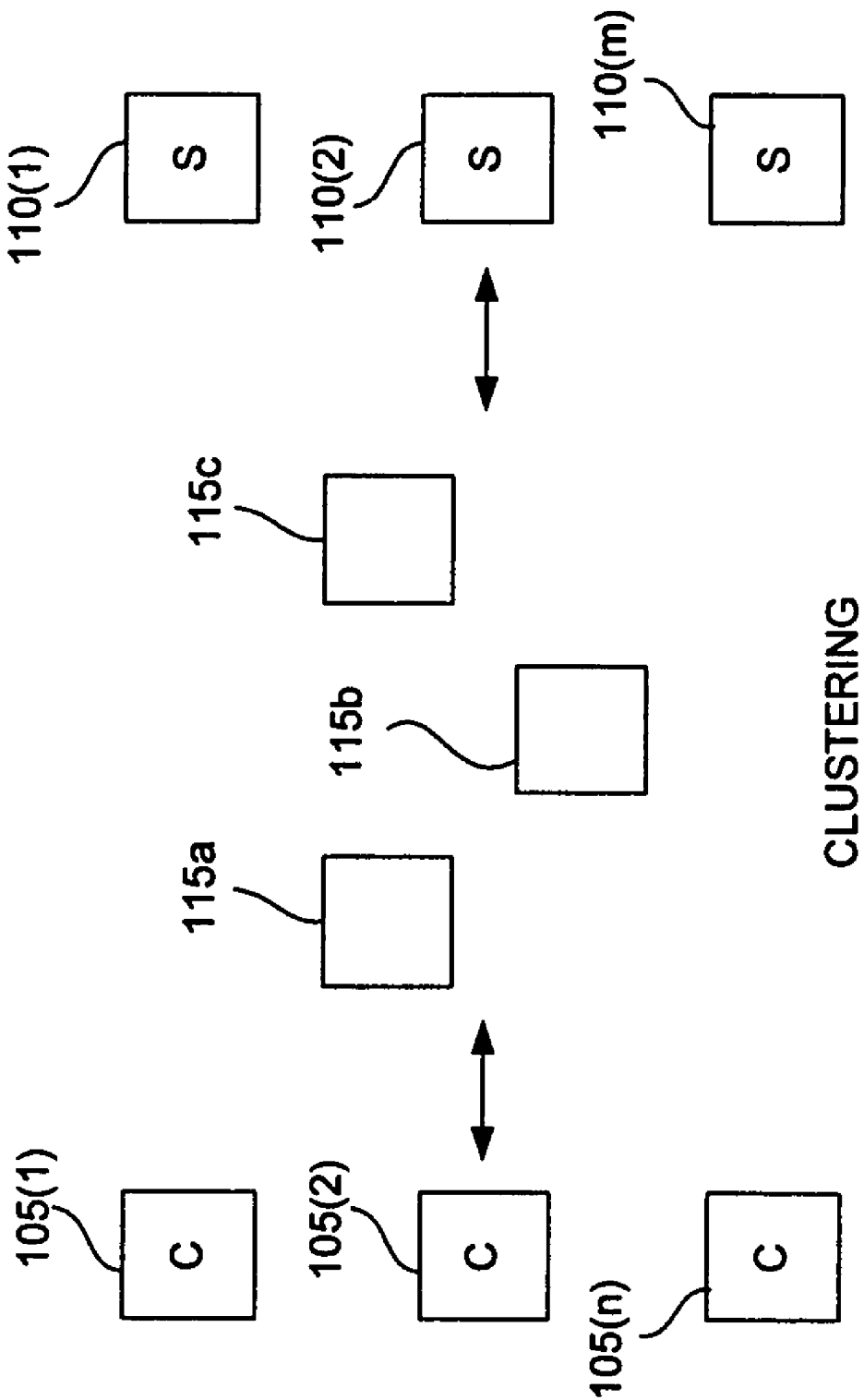
FIG. 19 illustrates a block diagram including multiple proxy caches in a cluster configuration, in accordance with an embodiment of the invention.

FIG. 19 illustrates a block diagram including multiple proxy caches 115a-115c in a cluster configuration, in accordance with an embodiment of the invention. The number of proxy caches 115 may vary in FIG. 19. The cluster of proxy caches permits a method of an alternate route for client request traffic and data traffic if the primary proxy cache fails. The proxy caches 115 may be, for example, in different parts of the world or region. For example, if the proxy cache 115a is the primary cache and subsequently fails, then an alternate route for network traffic may be formed by selecting another proxy cache to be the primary proxy cache. For example, the proxy caches 115b and 115c may be chosen as the primary proxy cache. The updated proxy cache may be chosen based upon, for example, size (a larger-sized proxy cache will increase the probability of a cache hit), reduced traffic latency, location (e.g., choose a "peer" proxy cache or neighboring proxy caches), and/or the particular data being requested. The global name space feature and file handle translation feature permits clients 105 to access one proxy cache instead of another proxy cache. The rewriting of file handles is used, since the different proxy caches do not know about each other; the re-writing of file handles permit the clients to properly re-route their requests to particular a particular proxy cache and to permit the different proxy caches to understand the same messages. In contrast, in the HTTP protocol, names for an object are already imbedded with the name of the server.

Figure 20:
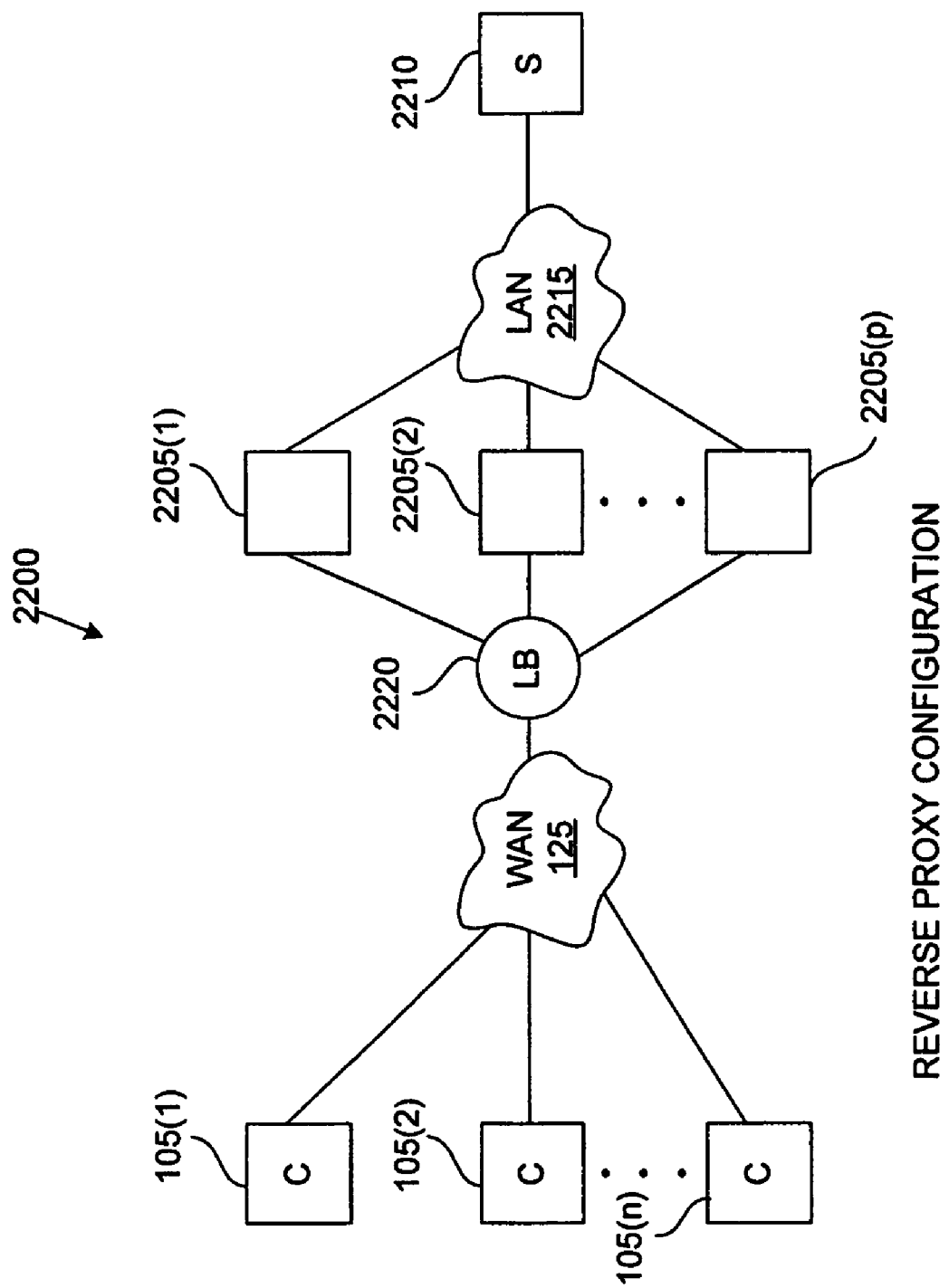
FIG. 20 is a block diagram of a network, including clients, proxy caches, and a server arranged in a reverse proxy configuration, in accordance with an embodiment of the invention.

FIG. 20 is a block diagram of a network 2200, including client devices 105(1) to 105(n), proxy caches 2205(1) to 2205(p), and a server 2210 arranged in a reverse proxy configuration, in accordance with an embodiment of the invention. The proxy caches (generally referred in FIG. 22 as 2205) permit the scaling or distribution of traffic to and from the server 2210. The proxy caches 2205 are locally connected to the server 2210 via LAN 2215. The variable p may be any suitable integer value. Thus, the number of proxy caches devices (generally referred in FIG. 22 herein as 2205) may vary. For example, the network 2200 may be implemented with only proxy cache 2205, particularly if the server 2210 has a slow rate of traffic processing speed. The client devices 105 may be coupled via WAN 125 to a load balancer 2220, such as a load balancing switch, which distributes traffic between the clients 105 and proxy caches 2205.

Figure 22:
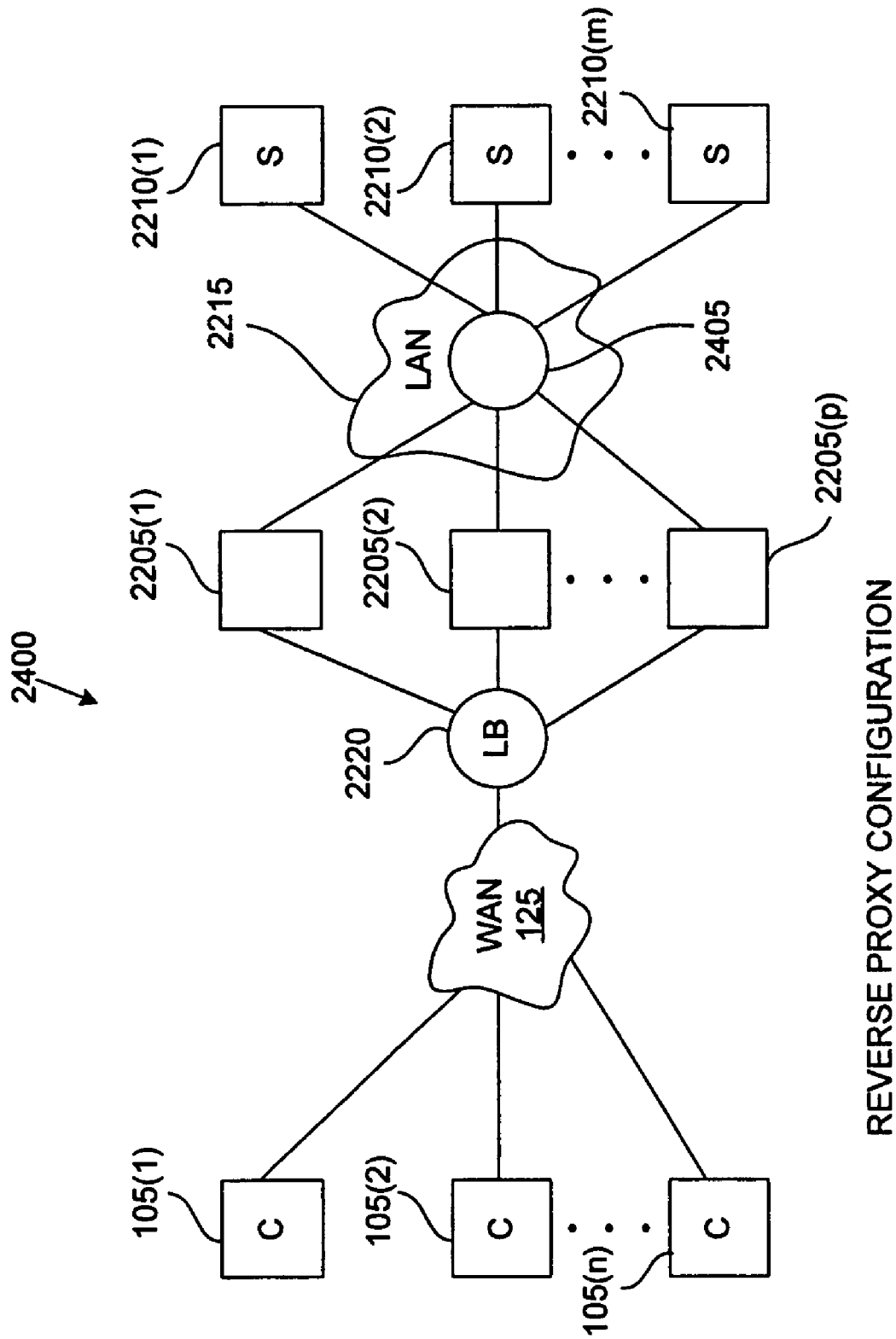
FIG. 22 is a block diagram of a network 2400 in accordance with another embodiment of the invention.

The reverse proxy configuration in FIG. 22 permits data to be cached on-demand by the proxy caches 2205. This on-demand caching operation is more efficient than standard replication techniques and does not require the special software for standard replication techniques. The multiple proxy caches 2205 permits a distribution of requests that are directed to the server 2210. The multiple proxy caches 2205 can collectively increase the chance of cache hits in response to a request from one of the clients 105, since each proxy cache 2205 will contain an active data set that may include the requested data. Thus, the multiple proxy caches 2205 can reduce the amount of requests that are transmitted to the server 2210 from a client 105.

Advantageously, if the server 2210 has a slow processing rate, the multiple proxy caches 2205 increase the chance of a cache hit and provide on-demand data caching for the clients 105. Thus, the slow processing rate of the server 2210 will not serve as a bottleneck to client requests. The reverse proxy configuration in FIG. 22 is very beneficial for read traffic (e.g., applications such as graphics rendering of movies). Also, mutation of file handles is typically not required in the reverse proxy configuration. Additionally, the use of the proxy caches is less expensive than use of file servers and replication of data in the proxy cache can occur automatically without the need for specialized software.

The load balancer 2220 distributes requests and data from cache hits. If there is a cache miss (i.e., none of the proxy cache 205 contains the requested data in their active data sets, then one of the proxy caches 205 will transmit a request to the server 210 for the requested data and will transmit the a cached copy of the data back to the requesting server.

Figure 21:
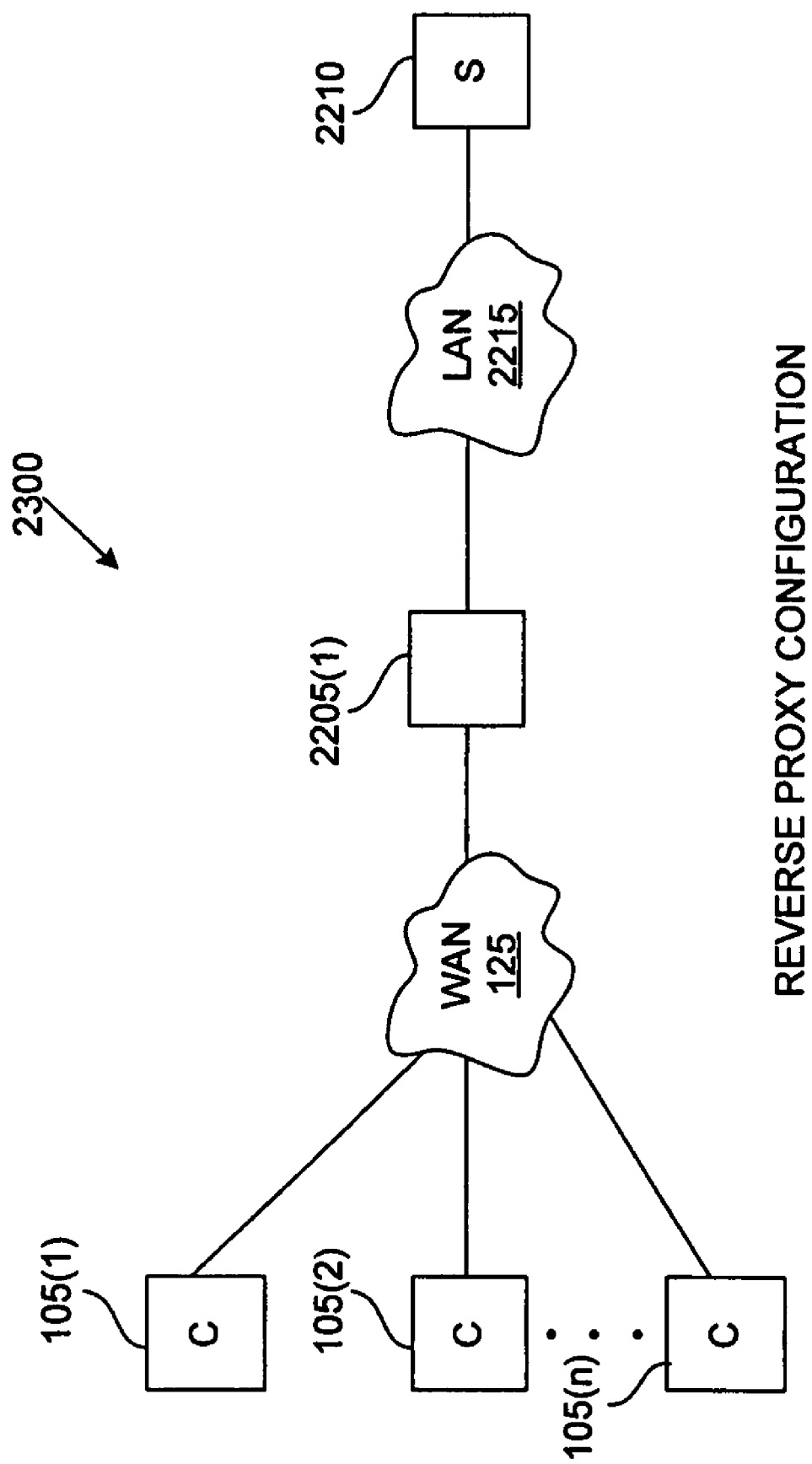
FIG. 21 shows a block diagram of a network 300, where only a single proxy cache 205(1) is coupled to the server 210 in the reverse proxy configuration.

FIG. 21 shows a block diagram of a network 2300, where only a single proxy cache 2205(1) is coupled to the server 2210 in the reverse proxy configuration. It is noted in this example that the server 2210 is sufficiently slow in processing rate. As a result, only one proxy cache 2205 may be implemented in the network 2300 for receiving client requests, for transmitting data back to the requesting client 105 if there is a cache hit, and for accessing the server 2210 if there is a cache miss.

FIG. 22 is a block diagram of a network 2400 in accordance with another embodiment of the invention. The proxy caches 2205(1) to 2205($p$) can communicate with a plurality of servers 2210(1) to 2210($m$) via a network switch 2405, for example. The variable m may be suitable integer value. Typically, the network switch 2405 may be implemented in the LAN 2215. Thus, the proxy caches 2205 permit the scaling or distribution of traffic to and from the plurality of servers 2210 and permit traffic acceleration to and from the servers 2210. The reverse proxy configuration in FIG. 22 prevents the servers 2210 from acting as a bottleneck to client traffic, particularly if the servers are of slower processing capability.

Figure 23:
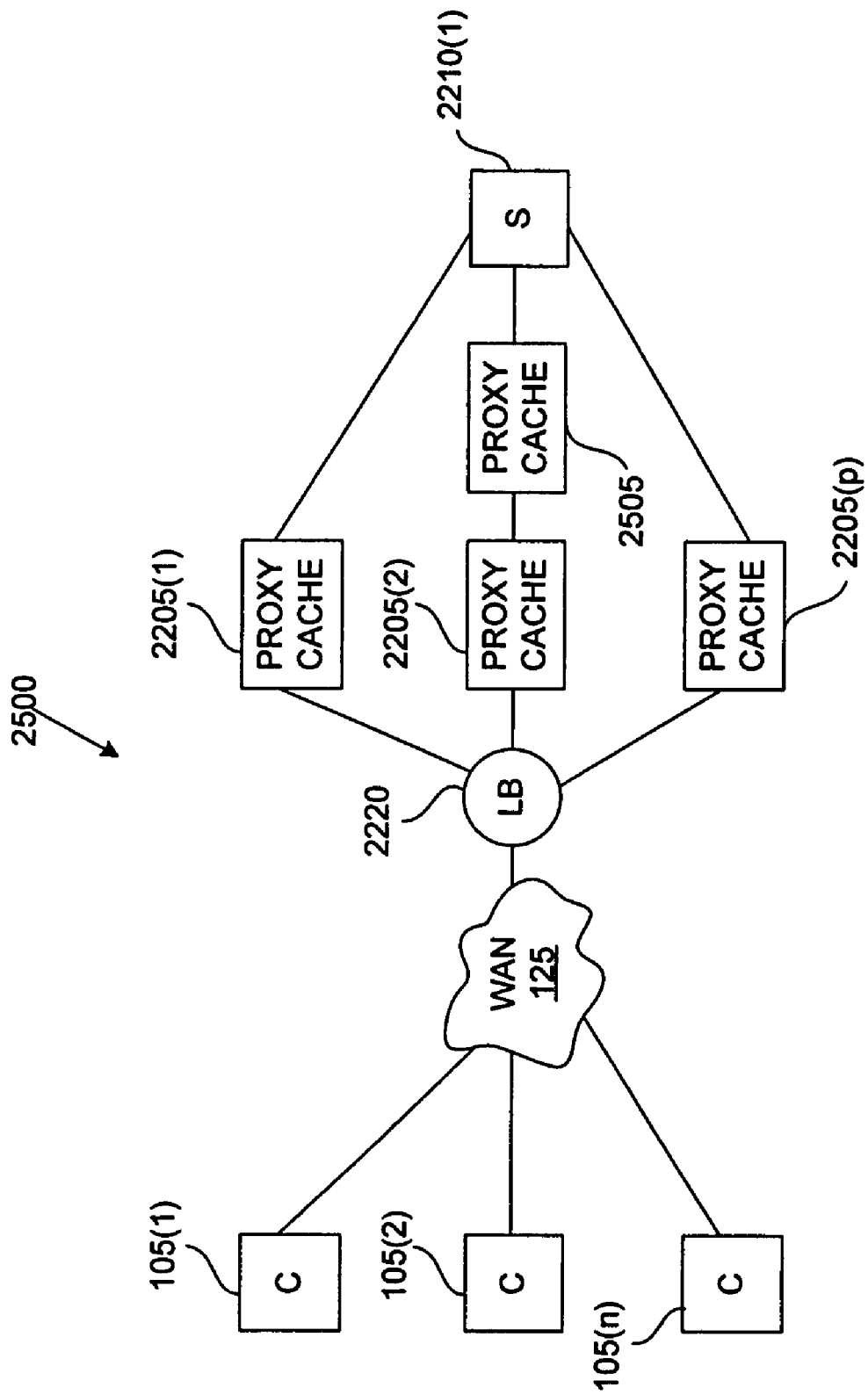
FIG. 23 is a block diagram of a network 2500 in accordance with another embodiment of the invention.

FIG. 23 is a block diagram of a network 2450 in accordance with another embodiment of the invention. A proxy cache 2505 is clustered with the proxy caches 2205(1) to 2205($p$), and can perform the various functions described above for clustered proxy caches.

Embodiments of the invention advantageously reduce the latency for clients as opposed to prior approaches where clients are required to access a server for all data requests. Embodiments of the invention advantageously increase the ease of administration of clients and/or servers, since special software for clients are not required and servers may be easily administered at remote locations. Embodiments of the invention advantageously increase the ease of replication of data by avoiding required mirroring steps of previous approaches. Specifically, embodiments of the invention do not require administrators to permit the mirroring of data on given intervals. Embodiments of the invention advantageously require less disk requirements, since the total active data set is smaller in size than the total data set in a server. Less disk requirements lead to cheaper costs and less failure problems. Embodiments of the invention advantageously permit many clients to make many requests for data without saturating the network in the reverse proxy configuration.

The various engines or modules discussed herein may also be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Aspects of the invention may also be implemented in hardware, software, firmware, and/or a combination of any of hardware, software, or firmware.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. In a proxy cache device, a method of performing a delayed write operation to a server, the method comprising:
   receiving, by a proxy cache device, a write operation from a client, wherein the client is coupled by a first communication network to the proxy cache device, and the proxy cache device is coupled by a second communication network to the server;
   buffering, by the proxy cache device, write data associated with the write operation via the first communication network from the client; and
   performing a delayed write operation from the proxy cache device via the second communication network to the server, the delayed write operation involving the buffered write data.

2. The method of claim 1, wherein the act of performing the delayed write operation comprises:
   writing the buffered write data to the server at a delayed time subsequent to the write operation from the client.

3. The method of claim 2, wherein the buffered write data is written to the server after connection is re-established between the proxy cache device and the server along the second communication network.

4. The method of claim 2, wherein the buffered write data is written to the server based upon a schedule.

5. The method of claim 1, wherein the act of performing the delayed write operation comprises:
   writing the buffered write data to the server at a rate that is slower than a rate of the write operation from the client.

6. The method of claim 1, wherein the buffered write data is subsequently flushed from the proxy cache device.

7. An apparatus for performing a delayed write operation to a server, the apparatus comprising:
   a proxy cache device configured to receive a write operation from a client, wherein the client is coupled by a first communication network to the proxy cache device, and the proxy cache device is coupled by a second communication network to the server, buffer write data associated with the write operation via the first communication network from the client, and perform a delayed write operation from the proxy cache device via the second communication network to the server, the delayed write operation involving the buffered write data.

8. The apparatus of claim 7, wherein proxy cache device is configured to write the buffered write data to the server at a delayed time subsequent to the write operation from the client.

9. The apparatus of claim 7, wherein the proxy cache device writes the buffered write data to the server after connection is re-established between the proxy cache device and the server along the second communication network.

10. The apparatus of claim 7, wherein the proxy cache device writes the buffered write data to the server based upon a schedule.

11. The apparatus of claim 7, wherein proxy cache device writes the buffered write data to the server at a rate that is slower than a rate of the write operation from the client.

12. The apparatus of claim 7, wherein proxy cache device subsequently flushes the buffered write data.

* * * * *